(12) United States Patent
Tulyakov et al.

(10) Patent No.: US 12,182,722 B2
(45) Date of Patent: *Dec. 31, 2024

(54) GENERATIVE NEURAL NETWORK DISTILLATION

(71) Applicant: Snap Inc., Santa Monica, CA (US)

(72) Inventors: Sergey Tulyakov, Marina del Rey, CA (US); Sergei Korolev, Marina del Rey, CA (US); Aleksei Stoliar, Marina del Rey, CA (US); Maksim Gusarov, Santa Monica, CA (US); Sergei Kotcur, Los Angeles, CA (US); Christopher Yale Crutchfield, San Diego, CA (US); Andrew Wan, Marina del Rey, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/213,145

(22) Filed: Jun. 22, 2023

(65) Prior Publication Data

US 2023/0334327 A1 Oct. 19, 2023

Related U.S. Application Data

(63) Continuation of application No. 17/189,563, filed on Mar. 2, 2021, now Pat. No. 11,727,280, which is a (Continued)

(51) Int. Cl.
*G06N 3/088* (2023.01)
*G06F 18/21* (2023.01)
(Continued)

(52) U.S. Cl.
CPC ......... *G06N 3/088* (2013.01); *G06F 18/2148* (2023.01); *G06F 18/2185* (2023.01);
(Continued)

(58) Field of Classification Search
CPC .......... G06N 3/088; G06N 3/045; G06N 3/08; G06N 3/047; G06F 18/2148;
(Continued)

(56) References Cited

U.S. PATENT DOCUMENTS 10,643,602 B2    5/2020   Li et al.
10,825,132 B2   11/2020   Rainy
(Continued)

OTHER PUBLICATIONS

U.S. Appl. No. 16/119,956 U.S. Pat. No. 10,963,748, filed Aug. 31, 2018, Generative Neural Network Distillation.
(Continued)

*Primary Examiner* — Wesley J Tucker
(74) *Attorney, Agent, or Firm* — Schwegman Lundberg & Woessner, P.A.

(57) ABSTRACT

A compact generative neural network can be distilled from a teacher generative neural network using a training network. The compact network can be trained on the input data and output data of the teacher network. The training network train the student network using a discrimination layer and one or more types of losses, such as perception loss and adversarial loss.

19 Claims, 17 Drawing Sheets

Related U.S. Application Data continuation of application No. 16/119,956, filed on Aug. 31, 2018, now Pat. No. 10,963,748.

(51) Int. Cl.
| | |
|---|---|
| *G06F 18/214* | (2023.01) |
| *G06N 3/045* | (2023.01) |
| *G06N 3/08* | (2023.01) |
| *G06V 10/764* | (2022.01) |
| *G06V 10/774* | (2022.01) |
| *G06V 10/778* | (2022.01) |
| *G06V 10/82* | (2022.01) |

(52) U.S. Cl.
CPC ............. *G06N 3/045* (2023.01); *G06N 3/08* (2013.01); *G06V 10/764* (2022.01); *G06V 10/7747* (2022.01); *G06V 10/7788* (2022.01); *G06V 10/82* (2022.01)

(58) Field of Classification Search
CPC ............. G06F 18/2185; G06V 10/764; G06V 10/7747; G06V 10/7788; G06V 10/82
See application file for complete search history.

(56) References Cited

U.S. PATENT DOCUMENTS

| | | | | |
|---|---|---|---|---|
| 10,950,021 | B2 * | 3/2021 | Dubey | G06F 30/27 |
| 10,963,748 | B1 | 3/2021 | Tulyakov et al. | |
| 11,145,042 | B2 | 10/2021 | Kubendran | |
| 11,354,922 | B2 | 6/2022 | Tulyakov et al. | |
| 11,403,838 | B2 | 8/2022 | Zhu et al. | |
| 11,461,639 | B2 | 10/2022 | Liu et al. | |
| 11,508,045 | B1 * | 11/2022 | Amthor | G06T 5/94 |
| 11,636,639 | B2 * | 4/2023 | Adamson, III | G06V 10/764 |
| | | | | 345/629 |
| 11,727,280 | B2 * | 8/2023 | Tulyakov | G06V 10/764 |
| | | | | 382/156 |
| 11,893,657 | B2 * | 2/2024 | Kim | G06N 20/00 |
| 2017/0083829 | A1 | 3/2017 | Kang et al. | |
| 2017/0109571 | A1 | 4/2017 | Mcduff et al. | |
| 2018/0068463 | A1 | 3/2018 | Risser | |
| 2018/0158224 | A1 | 6/2018 | Bethge et al. | |
| 2018/0240257 | A1 | 8/2018 | Li et al. | |
| 2018/0268292 | A1 | 9/2018 | Choi et al. | |
| 2018/0293734 | A1 | 10/2018 | Lim et al. | |
| 2018/0365564 | A1 | 12/2018 | Huang et al. | |
| 2019/0122404 | A1 | 4/2019 | Freeman et al. | |
| 2019/0213705 | A1 * | 7/2019 | Kamath | G06N 3/045 |
| 2019/0244103 | A1 | 8/2019 | Wang et al. | |
| 2019/0259134 | A1 * | 8/2019 | Rainy | G06N 3/08 |
| 2019/0325269 | A1 | 10/2019 | Bagherinezhad et al. | |
| 2019/0392248 | A1 * | 12/2019 | Zhang | G06V 10/761 |
| 2020/0125927 | A1 | 4/2020 | Kim | |
| 2020/0134506 | A1 | 4/2020 | Wang et al. | |
| 2020/0219274 | A1 * | 7/2020 | Afridi | G06N 20/00 |
| 2020/0285896 | A1 * | 9/2020 | Huang | G06F 18/21322 |
| 2021/0182624 | A1 | 6/2021 | Tulyakov et al. | |
| 2022/0051400 | A1 * | 2/2022 | Izadyyazdanabadi | |
| | | | | G06N 3/045 |
| 2022/0101586 | A1 | 3/2022 | Krishnan Gorumkonda et al. | |
| 2022/0222872 | A1 | 7/2022 | Ghosh et al. | |
| 2022/0292724 | A1 | 9/2022 | Ren et al. | |
| 2023/0027309 | A1 * | 1/2023 | Kuta | G06V 40/172 |
| 2024/0005574 | A1 * | 1/2024 | Zhang | G06T 11/40 |

OTHER PUBLICATIONS

U.S. Appl. No. 17/189,563, filed Mar. 2, 2021, Generative Neural Network Distillation.

"U.S. Appl. No. 16/119,956, Examiner Interview Summary mailed Sep. 1, 2020", 3 pgs.

"U.S. Appl. No. 16/119,956, Examiner Interview Summary mailed Nov. 17, 2020", 3 pgs.

"U.S. Appl. No. 16/119,956, Final Office Action mailed Sep. 18, 2020", 11 pgs.

"U.S. Appl. No. 16/119,956, Non Final Office Action mailed May 22, 2020", 9 pgs.

"U.S. Appl. No. 16/119,956, Notice of Allowance mailed Nov. 30, 2020", 7 pgs.

"U.S. Appl. No. 16/119,956, Response filed Aug. 24, 2020 to Non Final Office Action mailed May 22, 2020", 8 pgs.

"U.S. Appl. No. 16/119,956, Response filed Nov. 12, 2020 to Final Office Action mailed Sep. 18, 2020", 7 pgs.

"U.S. Appl. No. 17/189,563, Non Final Office Action mailed Oct. 27, 2022", 10 pgs.

"U.S. Appl. No. 17/189,563, Notice of Allowability mailed Apr. 18, 2023", 4 pgs.

"U.S. Appl. No. 17/189,563, Notice of Allowance mailed Mar. 23, 2023", 8 pgs.

"U.S. Appl. No. 17/189,563, Preliminary Amendment filed Apr. 2, 2021", 3 pgs.

Gatys, Leon A., et al., "Image Style Transfer Using Convolutional Neural Networks", IEEE Conference on Computer Vision and Pattern Recognition (CVPR), Las Vegas, NV, (Jun. 27-30, 2016), 2414-2423.

"U.S. Appl. No. 17/189,563, Amendment Under 37 CFR § 1.312 Filed Jun. 23, 2023", 6 pgs.

"U.S. Appl. No. 17/189,563, PTO Response to Rule 312 Communication mailed Jul. 13, 2023", 2 pgs.

* cited by examiner

GENERATIVE NEURAL NETWORK DISTILLATION

PRIORITY CLAIM

This application is a continuation of U.S. application Ser. No. 17/189,563, filed Mar. 2, 2021, which is a continuation of U.S. application Ser. No. 16/119,956, filed Aug. 31, 2018, which are hereby incorporated by reference in their entireties.

TECHNICAL FIELD

Embodiments of the present disclosure relate generally to machine learning and, more particularly, but not by way of limitation, to implementing compact generative neural networks.

BACKGROUND

Machine learning schemes can be trained to perform image processing tasks, such as image style transfer. For example, a neural network can be trained to modify an image so that the image appears as if it was painted in the style of a famous painter (e.g., Monet). These machine learning schemes often have large memory requirements which can make them ill-suited for execution on client devices, such as smartphones, tablets, and laptops.

BRIEF DESCRIPTION OF THE DRAWINGS

To easily identify the discussion of any particular element or act, the most significant digit or digits in a reference number refer to the figure ("FIG.") number in which that element or act is first introduced.

DETAILED DESCRIPTION

Figure 1:
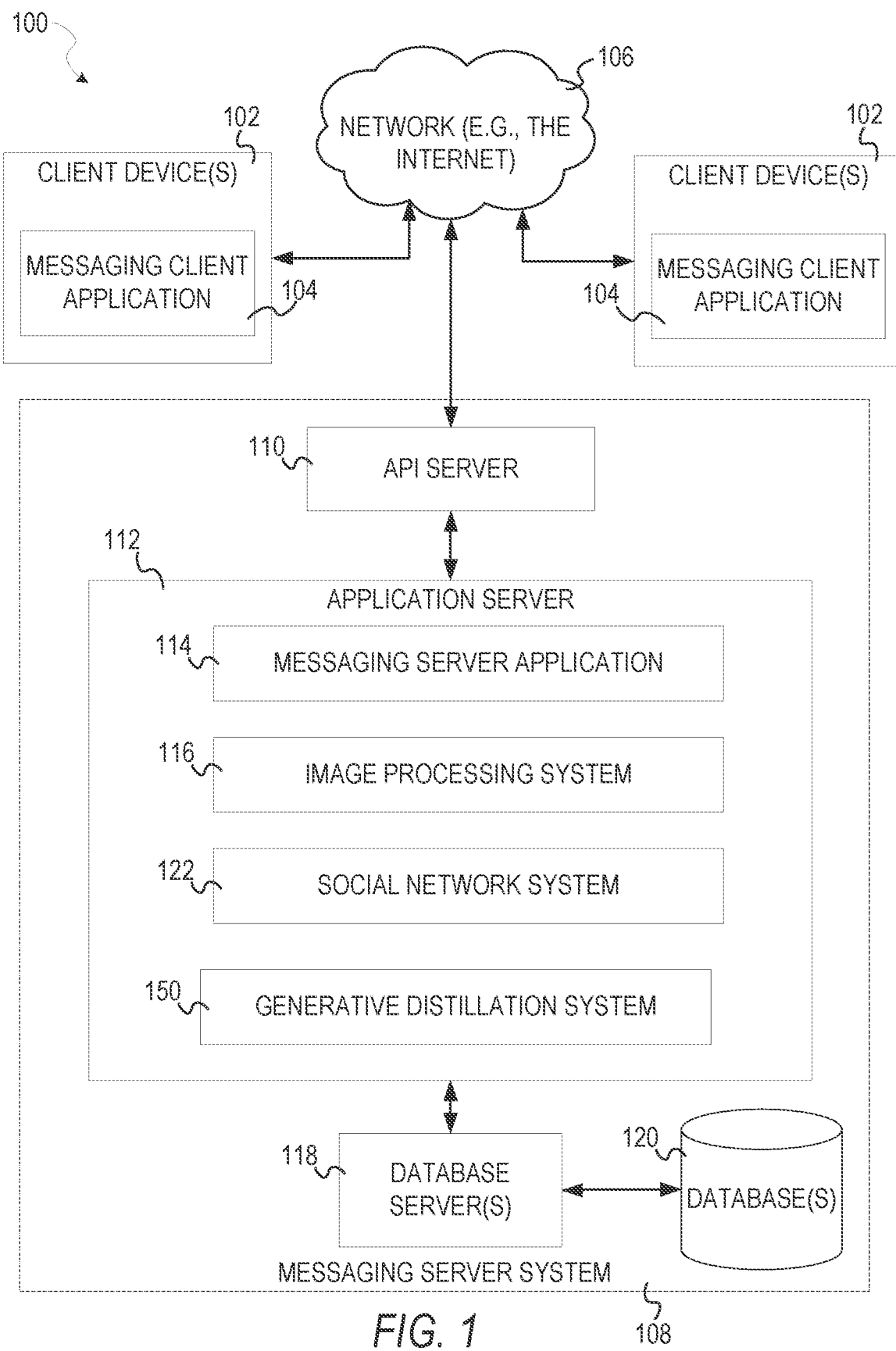
FIG. 1 is a block diagram showing an example messaging system for exchanging data (e.g., messages and associated content) over a network.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

As discussed, some machine learning schemes have large memory requirements that limit their use on computers with limited resources (e.g., a smartphone). To this end, a generative distillation system can generate a compact generative neural network by training a student generative neural network (GNN) on training data using a training network. The training data can be generated by a pre-trained teacher GNN (e.g., a large generative neural network trained to perform a certain task). Generative neural networks are neural network that generate output data by modifying or otherwise processing input data. One example of a generative neural network includes a convolutional neural network that is configured to perform image style transfer, e.g., stylize an image to mimic the style of the painter Monet. An example of a non-generative neural network includes an object classification neural network, which can identify an object in an image and generate likelihoods that the object is a car, an apple, and so on.

In some example embodiments, a student GNN is trained on the input data and output data from the teacher GNN. The input data is the data that is input into the teacher GNN (e.g., photos of landscapes) and the output data is the data output from the teacher GNN (e.g., modified photos of landscapes in the style of Monet). In some example embodiments, a teacher GNN is first trained on a limited set of training data, such as a small set of images of real Monet paintings. After the teacher GNN is trained, it can be used to generate a larger set of training images for use in training the student GNN. In particular, for example, the teacher GNN can be applied to a large set of input images to generate a large set of output images. The large set of input images and output images can be stored as student training data. In this way, even if an initial set of training data is small, a larger set can be created utilizing the trained teacher network. In some example embodiments, the internal configuration of the teacher GNN is unknown. In those example embodiments, training data can still be generated by inputting images into the pretrained teacher GNN to yield output images, and storing the input and output data as training data for use in the student training network.

In some example embodiments, the training network includes the student GNN to be trained and a discrimination layer. The discrimination layer can receive output data from the student GNN and compare the output data to target data (e.g., ground truth data) from the teacher GNN. The student GNN can be trained with one or more losses, such as perception loss, task specific adversarial loss, task specific teeth loss, and high-frequency loss. In this way, a compact student GNN can replicate the results of a full size teacher GNN model can be distilled to a compact student GNN model (e.g., model size can be reduced from 30-300 Mb teacher GNN to 500-2000 Kb student GNN) while maintaining satisfactory generative result data.

FIG. 1 is a block diagram showing an example messaging system 100 for exchanging data (e.g., messages and associated content) over a network. The messaging system 100 includes multiple user devices, such as client devices 102, each of which hosts a number of applications including a messaging client application 104. Each messaging client application 104 is communicatively coupled to other instances of the messaging client application 104 and a messaging server system 108 via a network 106 (e.g., the Internet).

Accordingly, each messaging client application 104 is able to communicate and exchange data with another messaging client application 104 and with the messaging server system 108 via the network 106. The data exchanged between messaging client devices 102, and between a messaging client application 104 and the messaging server system 108, includes functions (e.g., commands to invoke functions) as well as payload data (e.g., text, audio, video, or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality within either the messaging client application 104 or the messaging server system 108 is a design choice. For example, it may be technically preferable to initially deploy certain technology and functionality within the messaging server system 108, and to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an application programming interface (API) server 110 is coupled to, and provides a programmatic interface to, an application server 112. The application server 112 is communicatively coupled to a database server 118, which facilitates access to a database 120 in which is stored data associated with messages processed by the application server 112.

The API server 110 receives and transmits message data (e.g., commands and message payloads) between the client devices 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., images or video) from a messaging client application 104 to a messaging server application 114 for possible access by another messaging client application 104; the setting of a collection of media data (e.g., a story); the retrieval of such collections; the retrieval of a list of friends of a user of a client device 102; the retrieval of messages and content; the adding and deletion of friends to and from a social graph; the location of friends within the social graph; and opening application events (e.g., relating to the messaging client application 104).

The application server 112 hosts a number of applications and subsystems, including the messaging server application 114, an image processing system 116, a social network system 122, and a generative distillation system 150. The messaging server application 114 implements a number of message-processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The application server 112 also includes the image processing system 116, which is dedicated to performing various image processing operations, typically with respect to images or video received within the payload of a message at the messaging server application 114.

The social network system 122 supports various social networking functions and services, and makes these functions and services available to the messaging server application 114. To this end, the social network system 122 maintains and accesses an entity graph (e.g., entity graph 304 in FIG. 3) within the database 120. Examples of functions and services supported by the social network system 122 include the identification of other users of the messaging system 100 with whom a particular user has relationships or whom the particular user is "following," and also the identification of other entities and interests of a particular user.

The generative distillation system 150 is configured to train student neural networks using data from teacher neural networks, as discussed in further detail below.

The application server 112 is communicatively coupled to a database server 118, which facilitates access to a database 120 in which is stored data associated with messages processed by the messaging server application 114.

Figure 2:
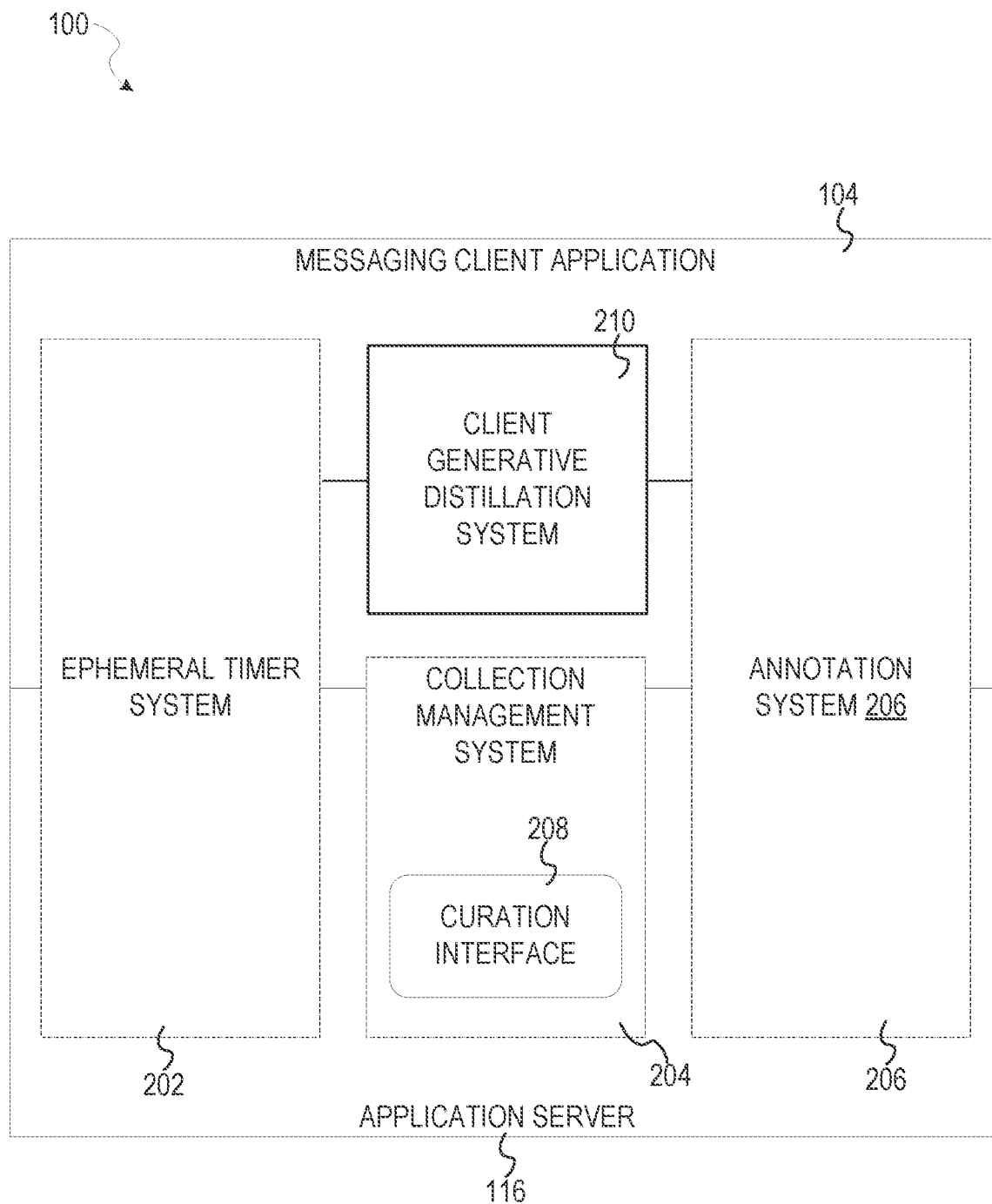
FIG. 2 is block diagram illustrating further details regarding a messaging system having an integrated virtual object machine learning system, according to example embodiments.

FIG. 2 is block diagram illustrating further details regarding the messaging system 100, according to example embodiments. Specifically, the messaging system 100 is shown to comprise the messaging client application 104 and the application server 112, which in turn embody a number of subsystems, namely an ephemeral timer system 202, a collection management system 204, an annotation system 206, and a client generative distillation system 210.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message or collection of messages (e.g., a story), selectively display and enable access to messages and associated content via the messaging client application 104. Further details regarding the operation of the ephemeral timer system 202 are provided below.

The collection management system 204 is responsible for managing collections of media (e.g., collections of text, image, video, and audio data). In some examples, a collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user-generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a geofilter or filter) to the messaging client application 104 based on a geolocation of the client device 102. In another example, the annotation system 206 operatively supplies a media overlay to the messaging client application 104 based on other information, such as social network information of the user of the client device 102 or a venue selected by the client generative distillation system 210. A media overlay may include audio and visual content and visual effects. Examples of audio and visual content include pictures, text, logos, animations, and sound effects. An example of a visual effect includes color overlaying. The audio and visual content or the visual effects can be applied to a media content item (e.g., a photo) at the client device 102. For example, the media overlay includes text that can be overlaid on top of a photograph generated by the client device 102. In another example, the media overlay includes an identification of a location (e.g., Venice Beach), a name of a live event, or a name of a merchant (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map and upload content associated with the selected geolocation. The user may also specify circumstances under which particular content should be offered to other users. The annotation system 206 generates a media overlay that includes the uploaded content and associates the uploaded content with the selected geolocation.

In another example embodiment, the annotation system 206 provides a merchant-based publication platform that enables merchants to select a particular media overlay associated with a geolocation via a bidding process. For example, the annotation system 206 associates the media overlay of a highest-bidding merchant with a corresponding geolocation for a predefined amount of time.

Figure 3:
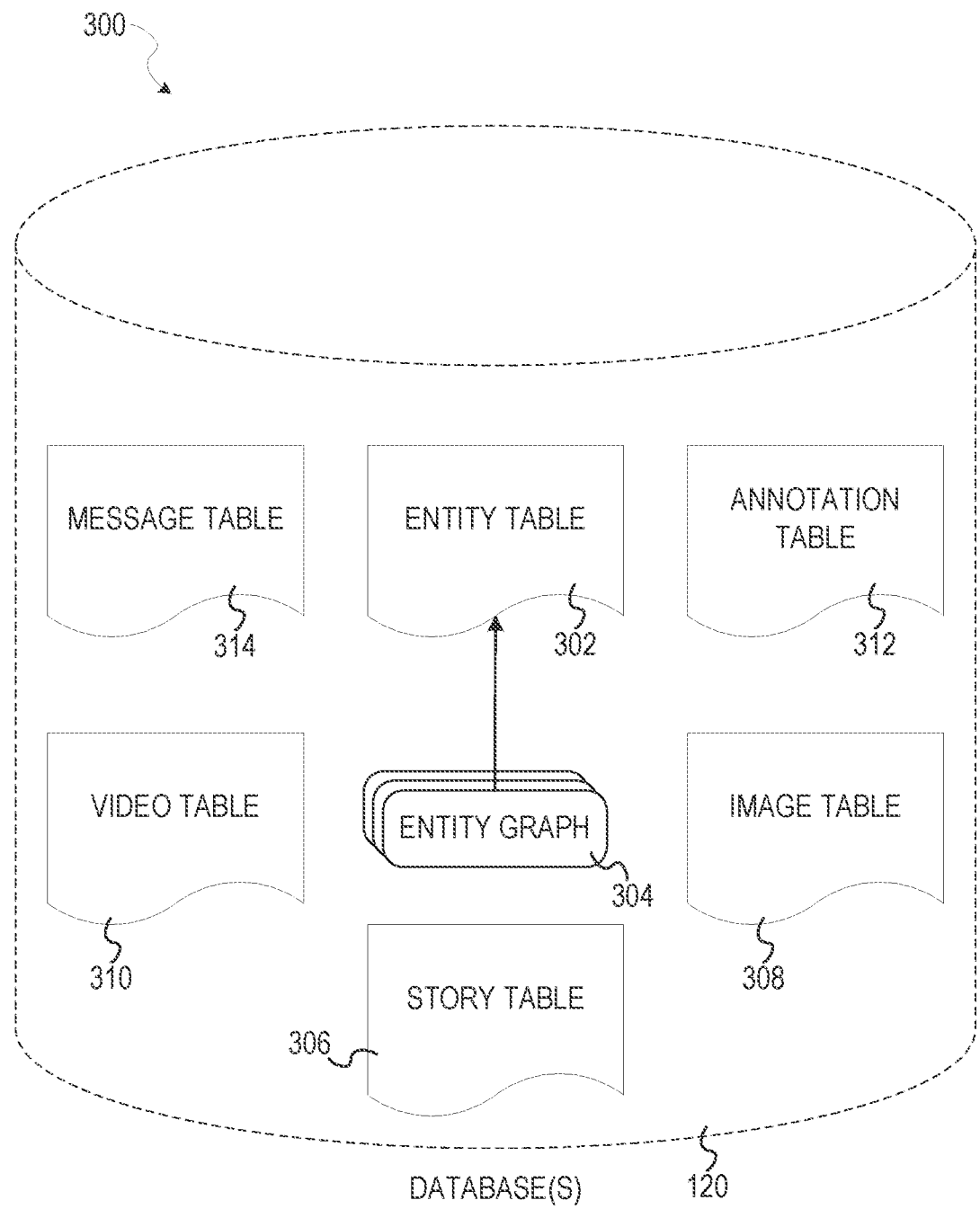
FIG. 3 is a schematic diagram illustrating data which may be stored in a database of a messaging server system, according to certain example embodiments.

FIG. 3 is a schematic diagram illustrating data 300 which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 314. An entity table 302 stores entity data, including an entity graph 304. Entities for which records are maintained within the entity table 302 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between or among entities. Such relationships may be social, professional (e.g., work at a common corporation or organization), interest-based, or activity-based, for example.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include a current temperature at a specific location, a current speed at which a sending user is traveling, a battery life for a client device 102, or the current time.

Other annotation data that may be stored within the image table 308 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the message table 314. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a story or a gallery). The creation of a particular collection may be initiated by a particular user (e.g., each user for whom a record is maintained in the entity table 302). A user may create a "personal story" in the form of a collection of content that has been created and sent/broadcast by that user. To this end, the user interface of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices 102 have location services enabled and are at a common location or event at a particular time may, for example, be presented with an option, via a user interface of the messaging client application 104, to contribute content to a particular live story. The live story may be identified to the user by the messaging client application 104 based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a compact degree of authentication to verify that the end user belongs to a specific organization or other entity (e.g., is a student on the university campus).

Figure 4:
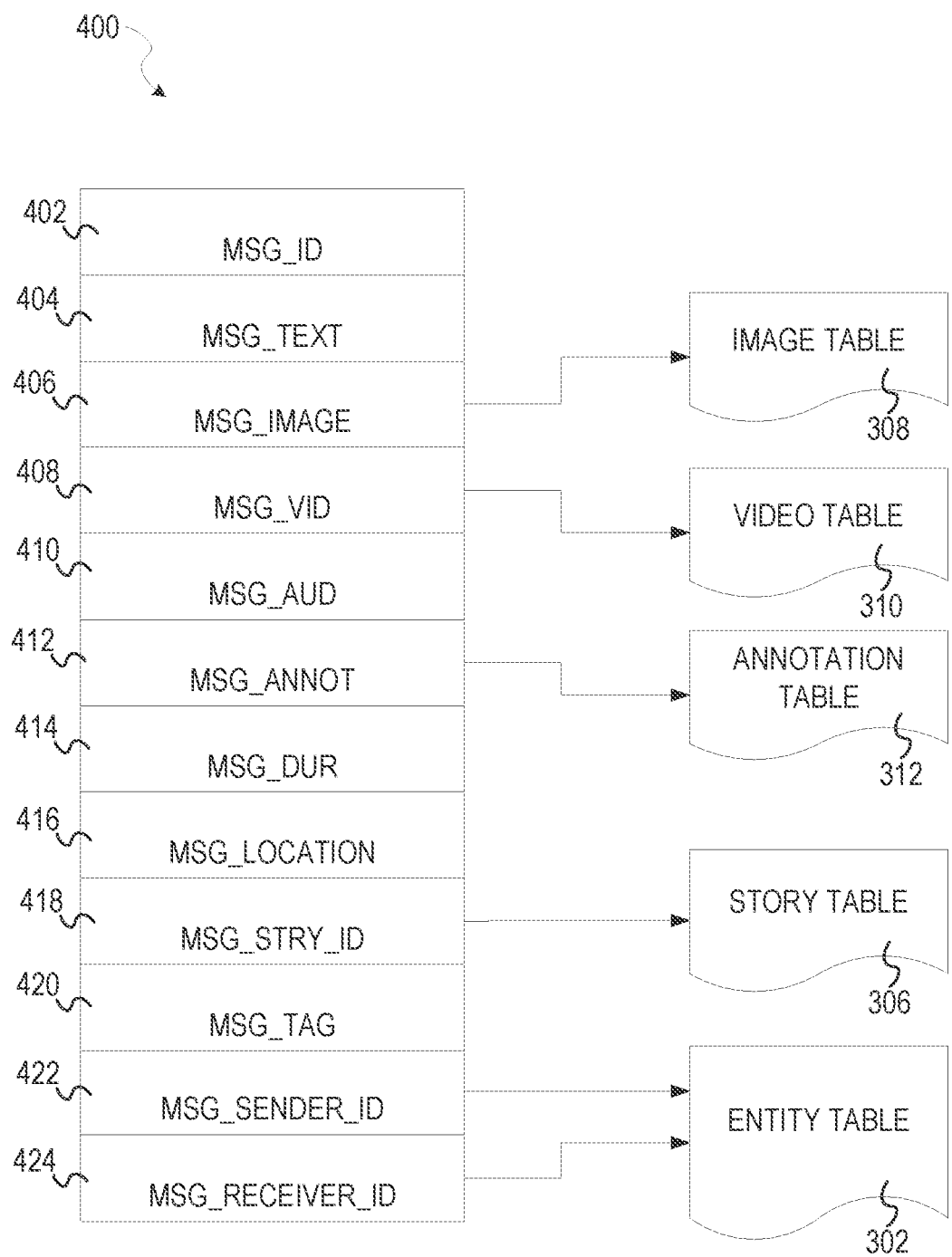
FIG. 4 is a schematic diagram illustrating a structure of a message, according to some embodiments, generated by a messaging client application for communication.

FIG. 4 is a schematic diagram illustrating a structure of a message 400, according to some embodiments, generated by a messaging client application 104 for communication to a further messaging client application 104 or the messaging server application 114. The content of a particular message 400 is used to populate the message table 314 stored within the database 120, accessible by the messaging server application 114. Similarly, the content of a message 400 is stored in memory as "in-transit" or "in-flight" data of the client device 102 or the application server 112. The message 400 is shown to include the following components:

A message identifier 402: a unique identifier that identifies the message 400.

A message text payload 404: text, to be generated by a user via a user interface of the client device 102 and that is included in the message 400.

A message image payload 406: image data captured by a camera component of a client device 102 or retrieved from memory of a client device 102, and that is included in the message 400.

A message video payload 408: video data captured by a camera component or retrieved from a memory component of the client device 102, and that is included in the message 400.

A message audio payload 410: audio data captured by a microphone or retrieved from the memory component of the client device 102, and that is included in the message 400.

Message annotations 412: annotation data (e.g., filters, stickers, or other enhancements) that represents annotations to be applied to the message image payload 406, message video payload 408, or message audio payload 410 of the message 400.

A message duration parameter 414: a parameter value indicating, in compacts, the amount of time for which content of the message 400 (e.g., the message image payload 406, message video payload 408, and message audio payload 410) is to be presented or made accessible to a user via the messaging client application 104.

A message geolocation parameter 416: geolocation data (e.g., latitudinal and longitudinal coordinates) associated with the content payload of the message 400. Multiple message geolocation parameter 416 values may be included in the payload, with each of these parameter values being associated with respective content items included in the content (e.g., a specific image in the message image payload 406, or a specific video in the message video payload 408).

A message story identifier 418: identifies values identifying one or more content collections (e.g., "stories") with which a particular content item in the message image payload 406 of the message 400 is associated. For example, multiple images within the message image payload 406 may each be associated with multiple content collections using identifier values.

A message tag 420: one or more tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address, or device identifier) indicative of a user of the client device 102 on which the message 400 was generated and from which the message 400 was sent.

A message receiver identifier 424: an identifier (e.g., a messaging system identifier, email address, or device identifier) indicative of a user of the client device 102 to which the message 400 is addressed.

The contents (e.g., values) of the various components of the message 400 may be pointers to locations in tables within which content data values are stored. For example, an image value in the message image payload 406 may be a pointer to (or address of) a location within the image table 308. Similarly, values within the message video payload 408 may point to data stored within the video table 310, values stored within the message annotations 412 may point to data stored in the annotation table 312, values stored within the message story identifier 418 may point to data stored in the story table 306, and values stored within the message sender identifier 422 and the message receiver identifier 424 may point to user records stored within the entity table 302.

Figure 5:
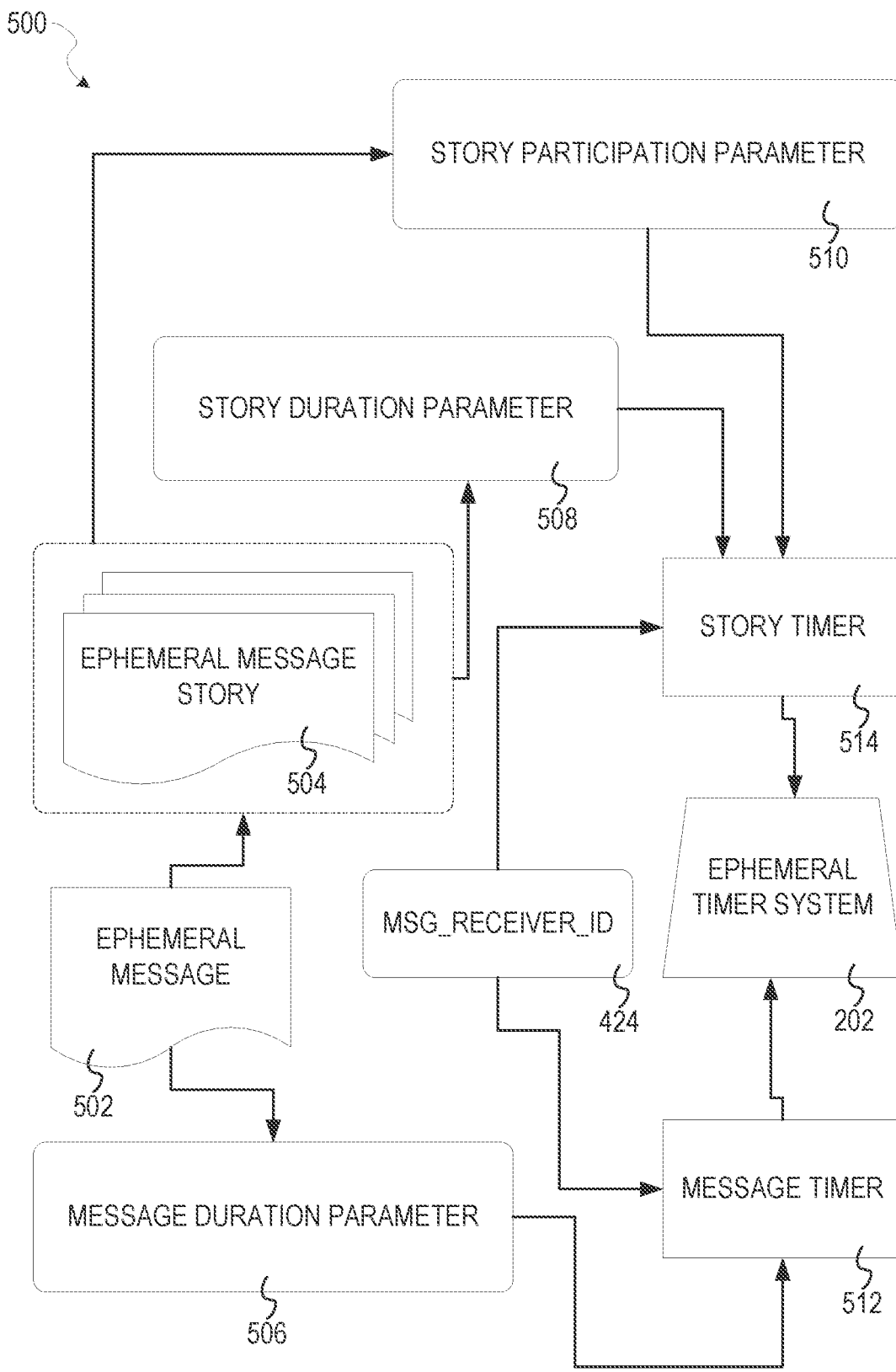
FIG. 5 is a schematic diagram illustrating an example access-limiting process, in terms of which access to content (e.g., an ephemeral message, and associated multimedia payload of data) or a content collection (e.g., an ephemeral message story) may be time-limited (e.g., made ephemeral).

FIG. 5 is a schematic diagram illustrating an access-limiting process 500, in terms of which access to content (e.g., an ephemeral message 502, and associated multimedia payload of data) or a content collection (e.g., an ephemeral message story 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client application 104. In one embodiment, where the messaging client application 104 is an application client, an ephemeral message 502 is viewable by a receiving user for up to a maximum of 10 compacts, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message story 504 (e.g., a personal story, or an event story). The ephemeral message story 504 has an associated story duration parameter 508, a value of which determines a time duration for which the ephemeral message story 504 is presented and accessible to users of the messaging system 100. The story duration parameter 508, for example, may be the duration of a music concert, where the ephemeral message story 504 is a collection of content pertaining to that concert. Alternatively, a user (either the owning user or a curator user) may specify the value for the story duration parameter 508 when performing the setup and creation of the ephemeral message story 504.

Additionally, each ephemeral message 502 within the ephemeral message story 504 has an associated story participation parameter 510, a value of which determines the duration of time for which the ephemeral message 502 will be accessible within the context of the ephemeral message story 504. Accordingly, a particular ephemeral message 502 may "expire" and become inaccessible within the context of the ephemeral message story 504, prior to the ephemeral message story 504 itself expiring in terms of the story duration parameter 508. The story duration parameter 508, story participation parameter 510, and message receiver identifier 424 each provide input to a story timer 514, which operationally determines whether a particular ephemeral message 502 of the ephemeral message story 504 will be displayed to a particular receiving user and, if so, for how long. Note that the ephemeral message story 504 is also aware of the identity of the particular receiving user as a result of the message receiver identifier 424.

Accordingly, the story timer 514 operationally controls the overall lifespan of an associated ephemeral message story 504, as well as an individual ephemeral message 502 included in the ephemeral message story 504. In one embodiment, each and every ephemeral message 502 within the ephemeral message story 504 remains viewable and accessible for a time period specified by the story duration parameter 508. In a further embodiment, a certain ephemeral message 502 may expire, within the context of the ephemeral message story 504, based on a story participation parameter 510. Note that a message duration parameter 506 may still determine the duration of time for which a particular ephemeral message 502 is displayed to a receiving user, even within the context of the ephemeral message story 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message story 504.

The ephemeral timer system 202 may furthermore operationally remove a particular ephemeral message 502 from the ephemeral message story 504 based on a determination that it has exceeded an associated story participation parameter 510. For example, when a sending user has established a story participation parameter 510 of 24 hours from posting, the ephemeral timer system 202 will remove the relevant ephemeral message 502 from the ephemeral message story 504 after the specified 24 hours. The ephemeral timer system 202 also operates to remove an ephemeral message story 504 either when the story participation parameter 510 for each and every ephemeral message 502 within the ephemeral message story 504 has expired, or when the ephemeral message story 504 itself has expired in terms of the story duration parameter 508.

In certain use cases, a creator of a particular ephemeral message story 504 may specify an indefinite story duration parameter 508. In this case, the expiration of the story participation parameter 510 for the last remaining ephemeral message 502 within the ephemeral message story 504 will determine when the ephemeral message story 504 itself expires. In this case, a new ephemeral message 502, added to the ephemeral message story 504, with a new story participation parameter 510, effectively extends the life of an ephemeral message story 504 to equal the value of the story participation parameter 510.

In response to the ephemeral timer system 202 determining that an ephemeral message story 504 has expired (e.g., is no longer accessible), the ephemeral timer system 202 communicates with the messaging system 100 (e.g., specifically, the messaging client application 104) to cause an indicium (e.g., an icon) associated with the relevant ephemeral message story 504 to no longer be displayed within a user interface of the messaging client application 104. Similarly, when the ephemeral timer system 202 determines that the message duration parameter 506 for a particular ephemeral message 502 has expired, the ephemeral timer system 202 causes the messaging client application 104 to no longer display an indicium (e.g., an icon or textual identification) associated with the ephemeral message 502.

Figure 6A:
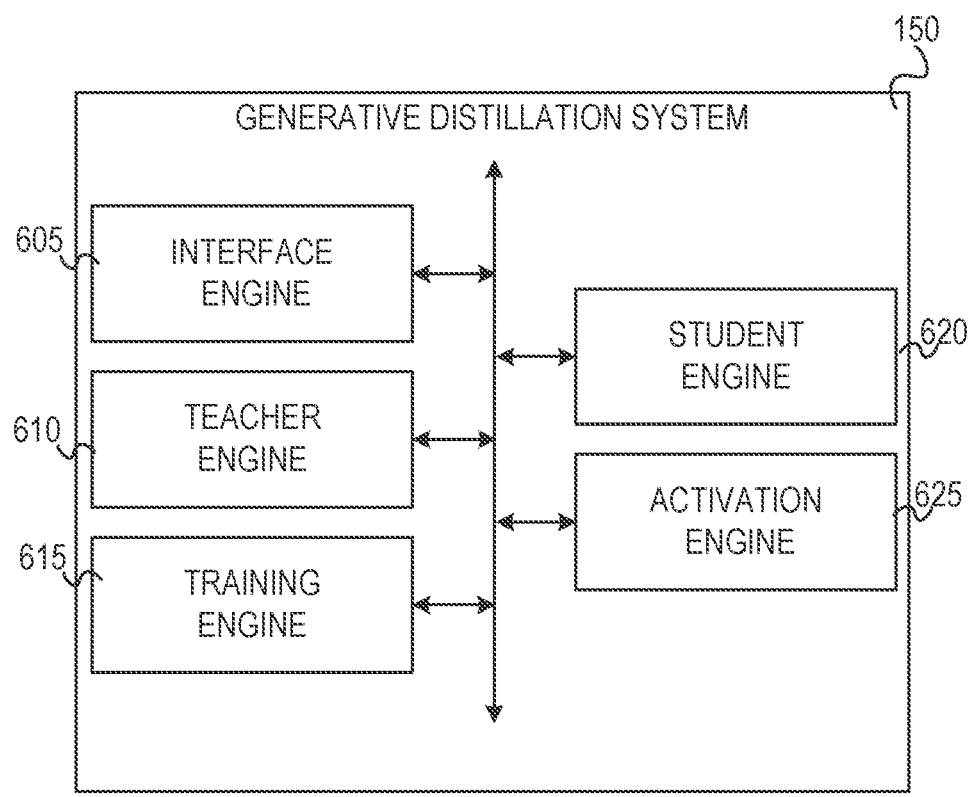
FIG. 6A shows internal functional engines of a generative distillation system, according to some example embodiments.

FIG. 6A shows internal functional engines of a generative distillation system 150, according to some example embodiments. As illustrated, the generative distillation system 150 comprises an interface engine 605, a teacher engine 610, a training engine 615, a student engine 620, and an activation engine 625. The interface engine 605 is configured to generate user interfaces and identify data for processing (e.g., generating an image using an image sensor of the client device, identifying an existing image for processing, etc.). The teacher engine 610 is configured to modify input data using a teacher generative neural network to generate output data. The training engine 615 manages training a student generative neural network on the input data and output data from the teacher generative neural network. The activation engine 625 configures selecting a trained student generative neural network based on the type of processing to be performed.

Figure 6B:
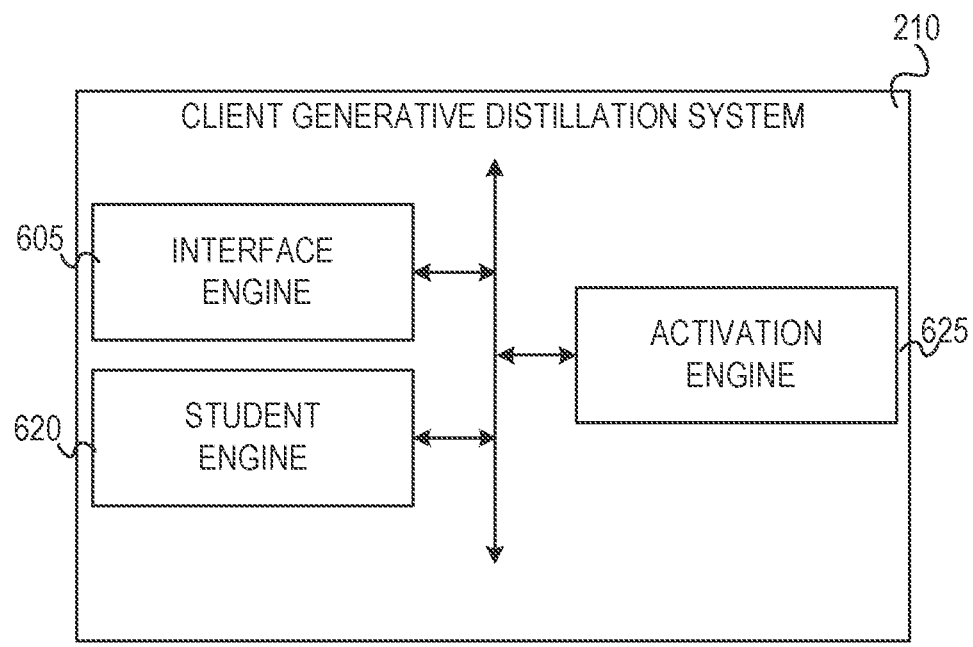
FIG. 6B shows example internal engines of a client generative distillation system, according to some example embodiments.

FIG. 6B shows example internal engines of a client generative distillation system 210, according to some example embodiments. The client generative distillation system 210 can include only engines that apply trained student GNNs, thereby decreasing the footprint of the client generative distillation system 210. For example, the client generative distillation system 210 comprises the interface engine 605, student engine 620, and the activation engine 625. After a given student generative neural network is trained using the training network 900 (which can include a discriminative layer, and other data as discussed in further detail with reference to FIG. 9, below), the trained student GNN is stored by itself, separate from the training network (i.e., without the discriminative layer, etc.). The student engine 620 can store a plurality of trained student GNNs, each trained to perform a different image task. When the interface engine 605 receives an input and instruction to apply a generative neural network affect (e.g., an instruction to apply image stylization), the activation engine 625 can select one of the trained student GNNs, which the student engine 620 can then apply to input data (e.g. an image).

Figure 7:
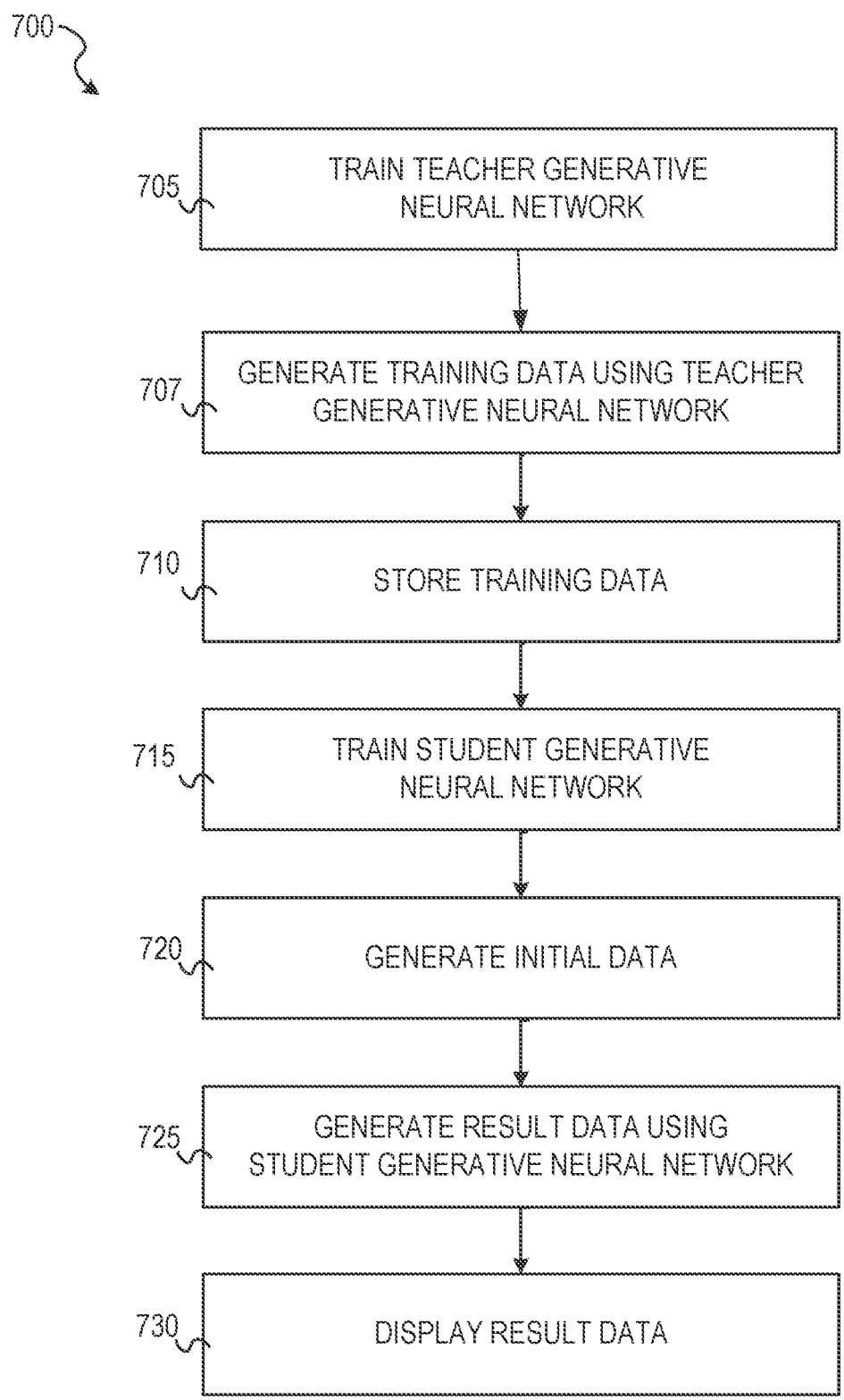
FIG. 7 illustrates a flow diagram of a method for implementing compact generative neural networks, according to some example embodiments.

FIG. 7 illustrates a flow diagram of a method 700 for implementing compact generative neural networks, according to some example embodiments. At operation 705, the training engine 615 trains a teacher generative neural network on an initial data set. For example, at operation 705, the training engine 615 trains the teacher GNN using a small set of images of real Monet paintings as training data.

At operation 707, the training engine 615 generates student training data using the teacher GNN. For example, at operation 710, the training engine 615 applies the teacher GNN to a large set of input images (e.g., landscape photos) to generate a large set of output images (e.g., simulated Monet-style landscape photos). In some example embodiments, the teacher GNN is pre-trained and no teacher training occurs. In those example embodiments, operation 705 is omitted and method 700 may start with generating training data using the pre-trained teacher GNN.

At operation 710, the training engine 615 stores the input images and output images as student training data for the student GNN. At operation 715, the training engine 615 trains a student generative neural network using a training network, as discussed in further detail below with reference to FIG. 9.

At operation 720, the interface engine 605 generates initial data for processing. For example, at operation 720, the interface engine 605 generates an image using an image sensor of a client device 102.

At operation 725, the student engine 620 generates results data by applying the trained student GNN on the initial data.

For example, at operation 725, the student generative engine 620 generates an image in a simulated Monet-style by applying the trained student GNN to the image.

At operation 730, the interface engine 605 displays the result data generated by the student generative neural network.

Figure 8:
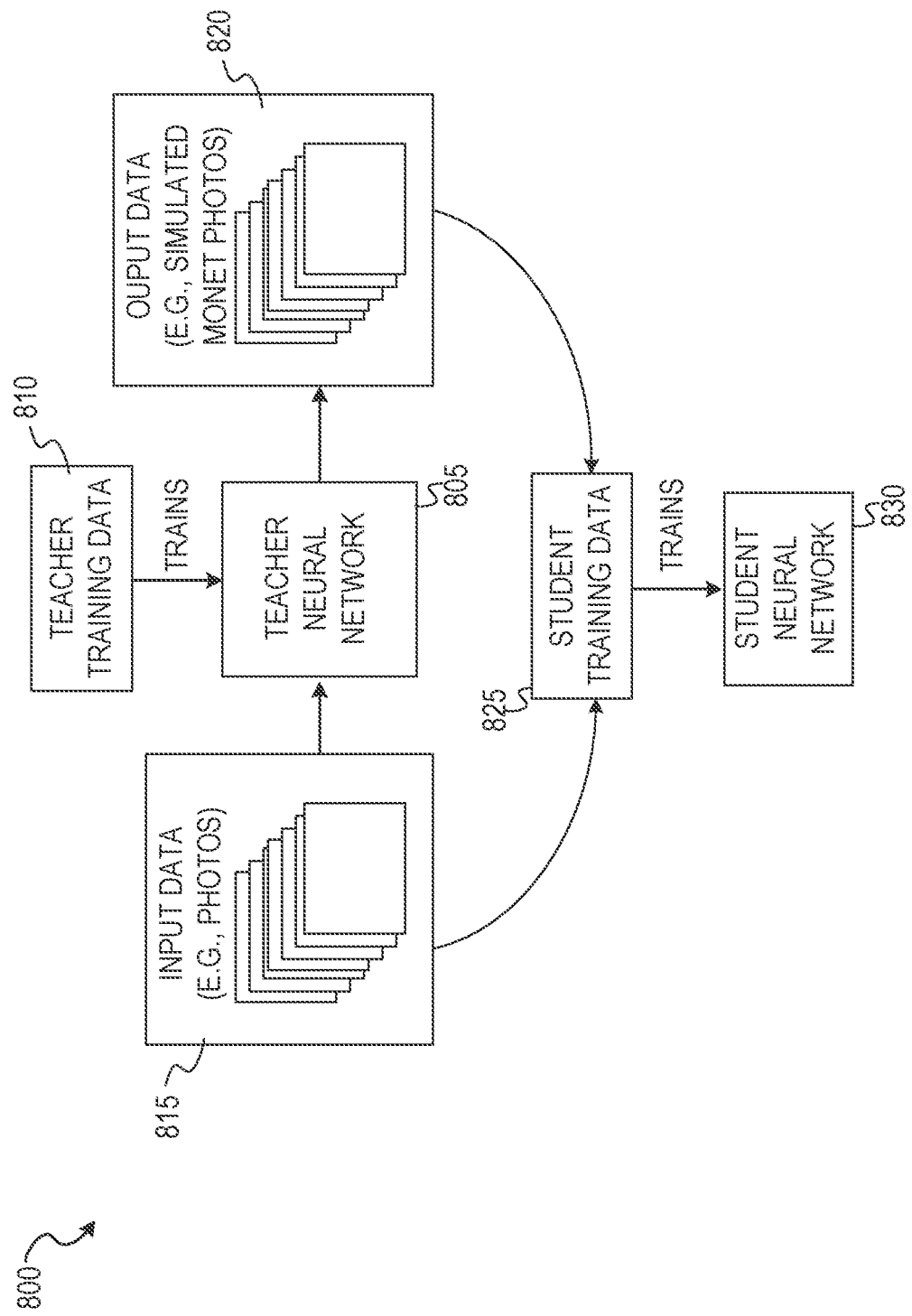
FIG. 8 shows example training data structure, according to some example embodiments.

FIG. 8 shows example training data structure 800, according to some example embodiments. The teacher training data 810 is an initial set of training data used to train the teacher neural network 805. Once the teacher neural network 805 is trained, a larger set of training data can be generated. For example, a large set of input data 815 (e.g., a large set of landscape photos) can be input into the teacher neural network 805 to yield a large set of output data 820 (e.g., the simulated Monet-style landscape photos). The input data 815 and the output data 820 are stored as student training data 825 for use in training the student neural network 830, as discussed in further detail in FIG. 9.

Figure 9:
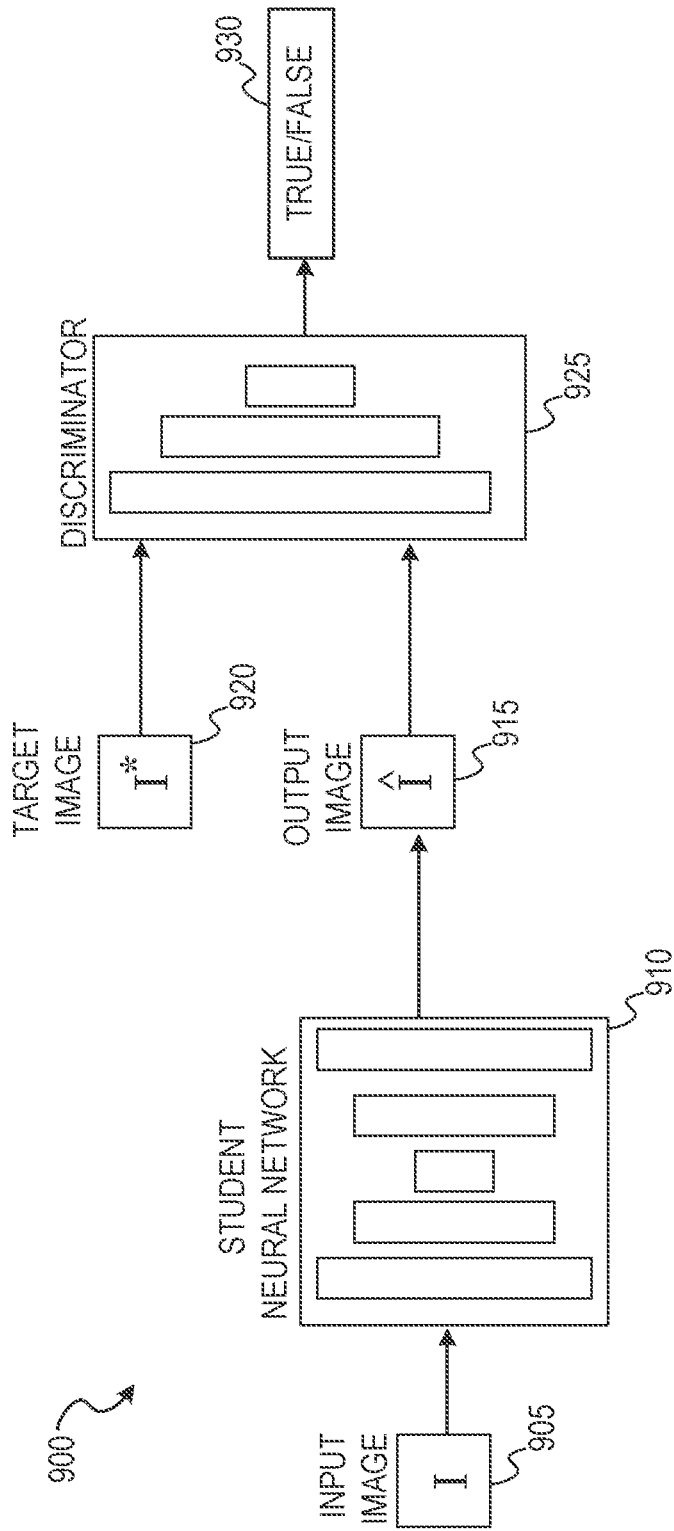
FIG. 9 shows a generative training network, according to some example embodiments.

FIG. 9 shows a generative training network 900, according to some example embodiments. In the example of FIG. 9, only a single image "I" is discussed, however it is appreciated that the training network 900 can utilize a large set of training data (e.g., the multiple input and output images in student training data 825) to train the student neural network. In some example embodiments, the student neural network 910 is a convolutional neural network configured to receive an input image 905 and generate an output image 915. The discriminator 925 is configured to evaluate the output image 915 against a target image 920, which is an output image generated by inputting input image 905 into the pre-trained teacher GNN. That is, in other words, the input image 905 may be one of the input images in input data 815 (FIG. 8), and the target image 920 may be one of the output images in output data 820 (generated by teacher neural network 805 in FIG. 8). Continuing, in some example embodiments, the discriminator 925 generates a classification output 930 that indicates whether the output image 915 satisfactory simulates the target image 920. The entire training network 900 is trained in an end-to-end manner as a single network. In some example embodiments, after the student neural network 910 is trained only the trained student neural network 910 is distributed to client devices 102, as discussed above with reference to FIG. 6B.

In some example embodiments, the training network 900 trains the student neural network using one or more of the following losses:

Perception loss:

$$L_p = \sum_{l \in L} \|P_l(\hat{I}) - P_l(I^*)\|_2$$

Task specific adversarial loss:

$$L_{adv} = E[\log(1 - D(G(I)))]$$

Task specific teeth loss:

$$L_t = \|S_v(M \odot \hat{I}) - S_v(M \odot \hat{I})\|_2$$

Task specific high-frequency loss:

$$L_{hf} = \|\text{LoG}(\hat{I}) - \text{LoG}(I^*)\|_2$$

where I, Î, I* are input, output, and target images, respectively; $P_l(\cdot)$ is the l-th layer of the pre-trained network, such as VGG-19 (Visual Geometry Group-19); $G(\cdot)$ is the student network, $D(\cdot)$ is the discriminator network, $S_v$ is the differential vertical Sobel operator, $\odot$ is element-wise matrix multiplication, M is a mouth region mask, and LoG is the differential Laplacian of Gaussian operator. Which losses are used by the student neural network in the training network can depend what type of image processing the student network is to perform, as discussed below with reference to FIG. 10.

Figure 10:
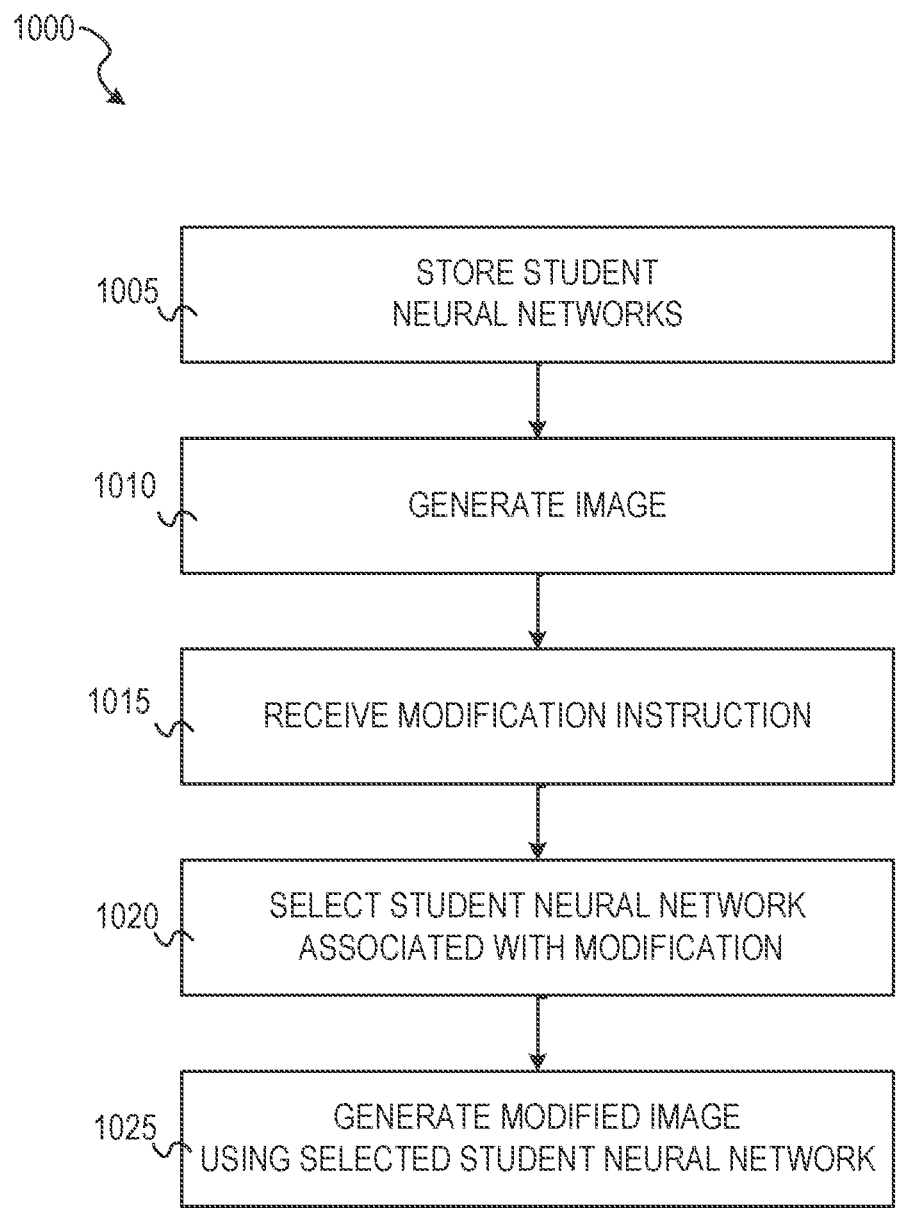
FIG. 10 shows a flow diagram of a method for selection of a student generative neural network to perform processing, according to some example embodiments.

FIG. 10 shows a flow diagram of a method 1000 for selection of a student generative neural network to perform processing, according to some example embodiments. Monet-style image transfers have been discussed above, but it is appreciated that other types of generative processing can be implemented using the compact student GNN training approach. In some example embodiments, which of the above losses are used in training depends on the type of generative processing to be performed. In some example embodiments, the training network 900 applies perception loss and task specific adversarial loss in the training of all student neural networks. In some example embodiments, additional losses are included in training to yield higher quality task-specific processing. For example, if the image to be processed depicts teeth, then the task specific teeth loss is included in the training network along with perception loss and the task specific loss. Further, if the image to be processed is considered a high-frequency image (e.g., a person smiling with smile wrinkles), then the task specific high-frequency loss can be included in the training network along with perception loss and task specific loss. High-frequency refers to the rate of pixel value changes in a given image: e.g., an image with lots of edges, wrinkles, corners would be a high-frequency image and an image featuring a uniform solid color with few features would be an example of a low-frequency image. In some example embodiments, multiple student GNNs are trained, where each trained student GNN configured to produce a certain image effect. For example, a first student GNN may be configured to apply a Monet-style transfer effect, a second student GNN may be configured to apply and "old" effect, whereby an image of a user is modified to make the person appear older (e.g., add wrinkles, etc.), a third student GNN may be applied to make the person appear younger (e.g., soften the face, remove wrinkles, enlarge eyes), and so on. Each of the student GNNs can be trained from a full-size teacher GNN (e.g., VGG-19) using the training network 900. FIG. 10 illustrates a method 1000 for selecting a student GNN based on the type of image manipulation to be performed.

At operation 1005, the activation engine 625 stores a plurality of student neural networks. Each of the student neural networks may be trained to apply different image effects using the training network 900 discussed above. At operation 1010, the interface engine 605 generates an image using an image sensor of the client device 102. For example, with reference to FIG. 11, a user 1100 uses a camera 1103 of client device 102 to generate an image 1105 of the user (e.g., a "selfie"), which can then be displayed on a user interface 1110.

At operation 1015, the interface engine 605 receives a modification instruction. For example, at operation 1015, the interface engine 605 receives a selection of one of the plurality of user interface buttons 1115. Each of the buttons 1115 can be configured to apply a different image effect. For example, the "B1," button can apply a Monet-style image transfer using a first GNN trained with the adversarial and perception loss, the "B2" button can be configured to apply an "old" image style transfer effect using adversarial loss, perception loss, and high-frequency loss trained student GNN, and so on.

At operation 1020, the activation engine 625 activates one of the student neural networks associated with the modification instruction received at operation 1015. For example, assuming the user 1100 selects "B1", a student GNN associated with the "B 1" button is activated.

At operation 1025, the generative student engine 620 generates a modified image using the activated student neural network. For example, the activated student GNN associated with the "B1" button is applied to image 1105 to generate a modified image.

Figure 11:
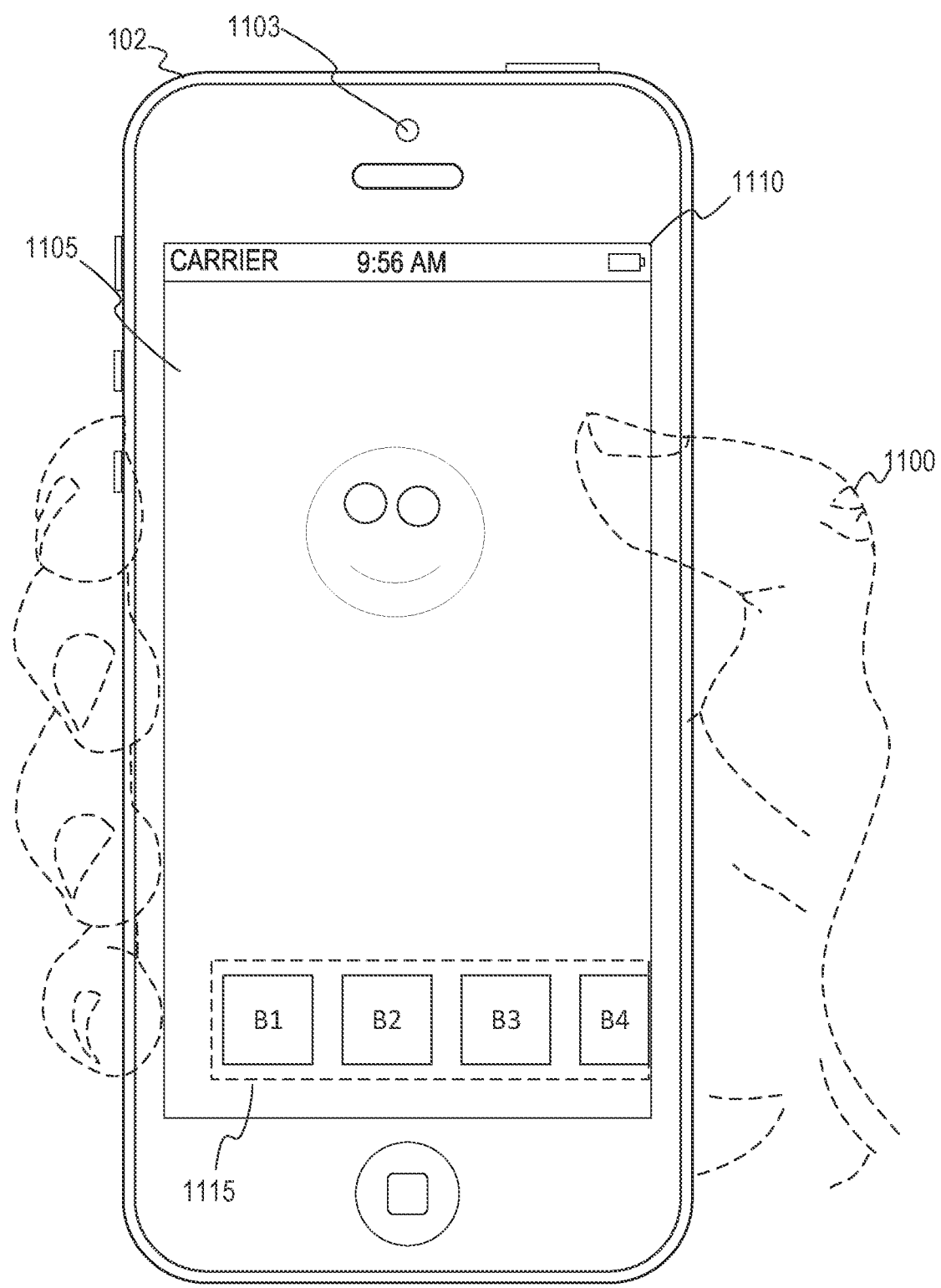
FIG. 11 shows an example user interface for implementing multiple student neural networks, according to some example embodiments.
Figure 12:
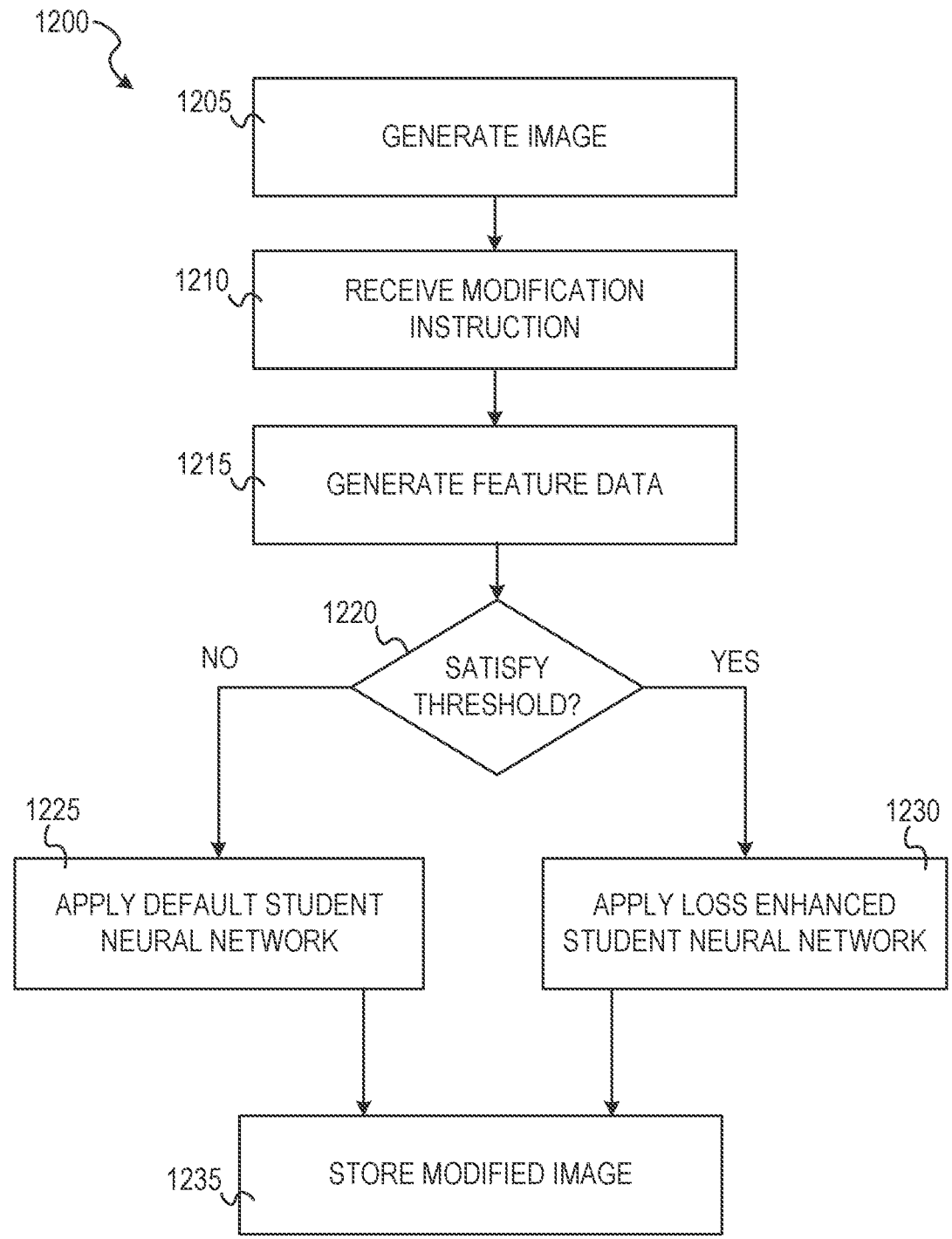
FIG. 12 shows an example flow diagram of a method for selecting a student neural network using detected features, according to some example embodiments.

FIG. 11 shows a flow diagram of a method 1200 for selection of a student neural network based on detected features, according to some example embodiments. As discussed, which losses are applied can be selected beforehand, based on the type of processing to be performed. In some example embodiments, initial analysis is performed to determine if the input image may benefit from additional losses. The method 1200 shows a method of selecting different student GNNs based on image features of a given image.

At operation 1205, the interface engine 605 generates an image using an image sensor of the client device. For example, with reference to FIG. 13A, a user 1300 selects button 1315 to generate an image 1305 using a camera 1303 of client device 102, which is then displayed on user interface 1307.

At operation 1210, the interface engine 605 receives a modification instruction. For example, the user 1300 screen taps the modify button 1310 which activates a student GNN trained to apply a young image-style effect in which wrinkles are removed, etc. At operation 1215, the activation engine 625 generates feature data that describes characteristics of the image. For example, at operation 1215, the activation engine 625 performs feature detection analysis on the image 1305 to determine that the image depicts teeth.

At operation 1220, the activation engine 625 determines whether the feature data generated at operation 1215 satisfies a threshold (e.g., whether the image depicts a pre-specified feature such as teeth, or is a high-frequency image with multiple edges). If the feature data does not satisfy the threshold, then the method continues to operation 1225 in which a default student neural network is applied to the image. Alternatively, if the feature data does satisfy the threshold, the method continues to operation 1230 in which a different student neural network (e.g., a student neural network trained with a different set of losses) is applied to the image. The resulting image is then stored by the student engine 620 at operation 1235.

Figure 13A:
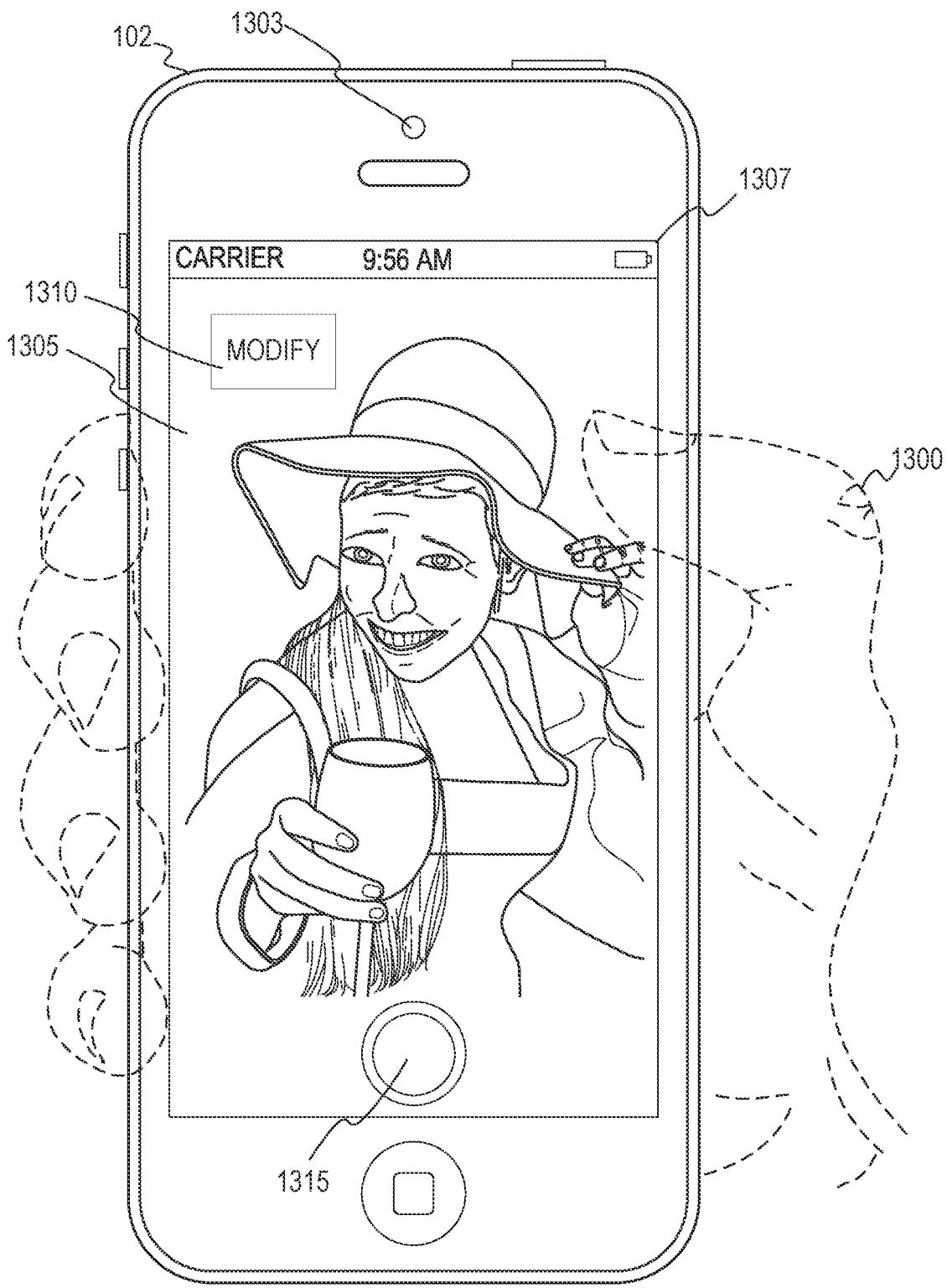
FIGS. 13A and 13B shows an example user interface for implementing a student neural network, according to some example embodiments.
Figure 13B:
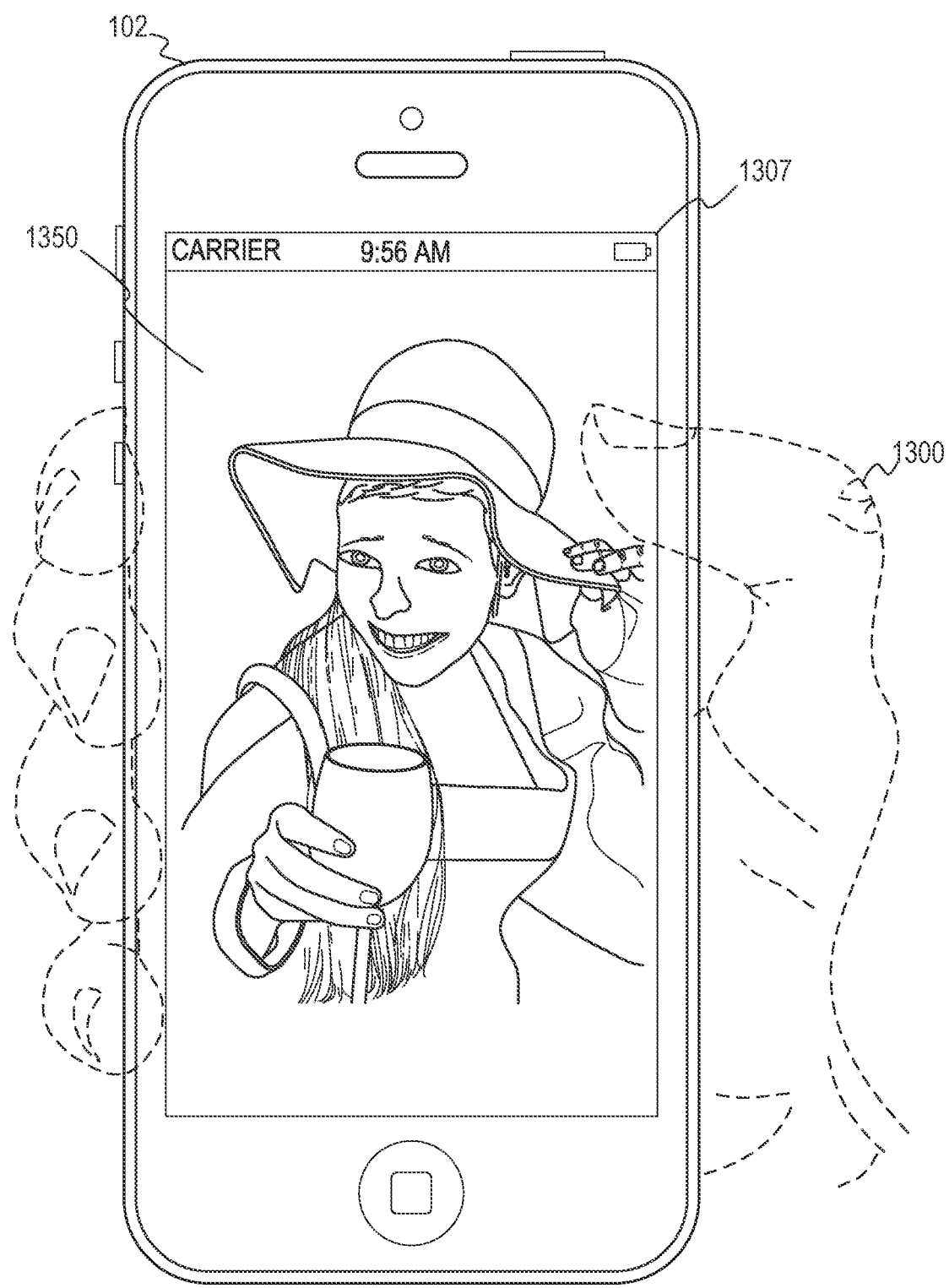

For example, with reference to FIG. 13A, the button 1310 can be configured to apply a "young" image effect by smoothing skin texture and removing wrinkles. The young image effect can be applied using a default student GNN trained with adversarial loss, perception loss, and high-frequency loss. In some example embodiments, responsive to selecting button 1310, the activation engine 625 determines that the image depicts teeth using a teeth object recognition neural network. Responsive to detecting the teeth, a different student GNN that is trained with the default losses (e.g., perception, adversarial, and high-frequency) and an additional loss (e.g., task specific teeth loss) to yield a higher quality modified image. FIG. 13B shows an example output image 1350 generated by the student GNN applied at operation 1130.

Figure 14:
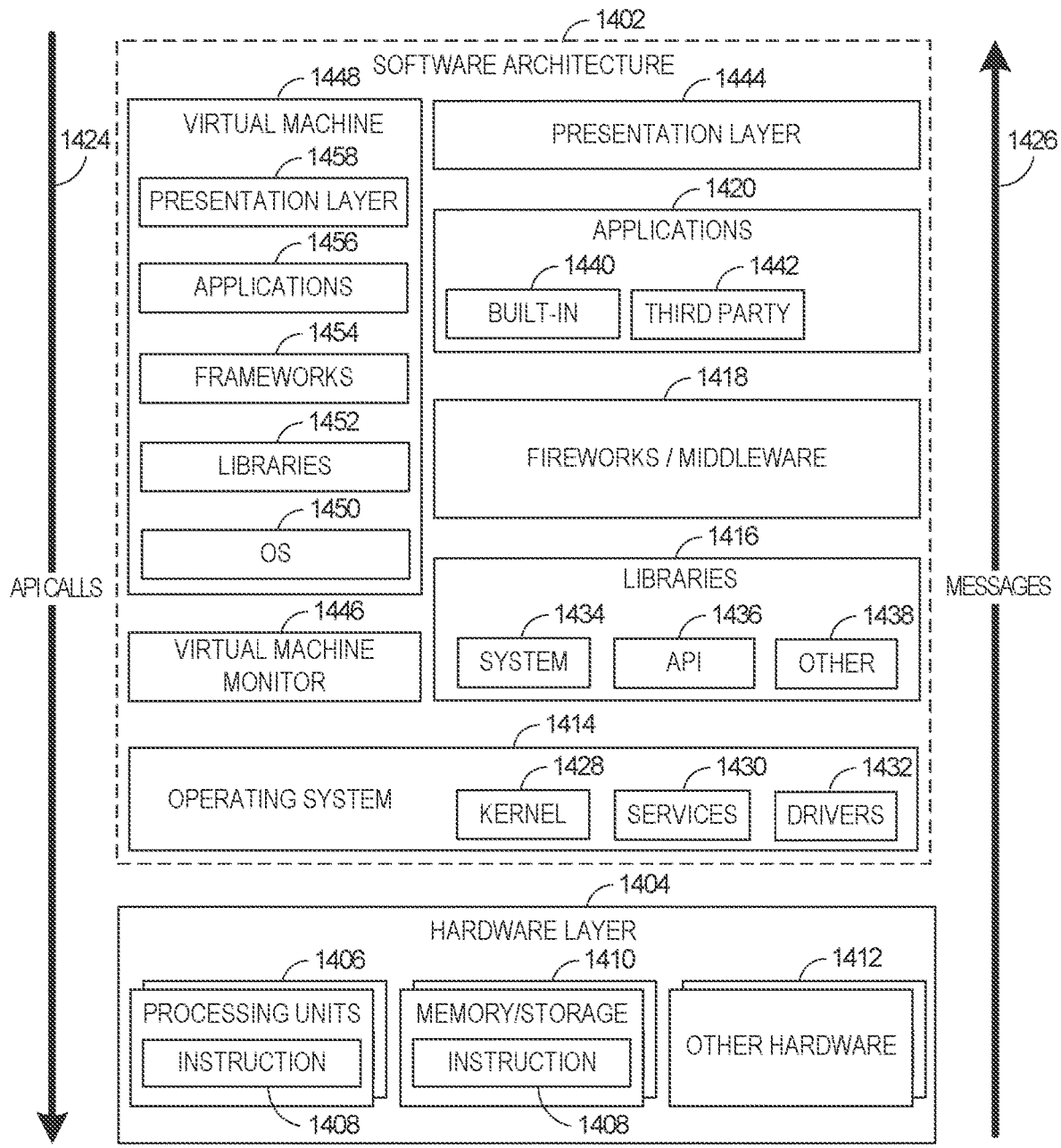
FIG. 14 is a block diagram illustrating a representative software architecture, which may be used in conjunction with various hardware architectures herein described.

FIG. 14 is a block diagram illustrating an example of a software architecture that may be installed on a machine, according to some example embodiments. FIG. 14 is merely a non-limiting example of a software architecture, and it will be appreciated that many other architectures may be implemented to facilitate the functionality described herein. The software architecture 1402 may be executing on hardware such as a machine 1500 of FIG. 15 that includes, among other things, processors 1510, memory 1530, and I/O components 1550. A representative hardware layer 1404 is illustrated and can represent, for example, the machine 1500 of FIG. 15. The representative hardware layer 1404 comprises one or more processing units 1406 having associated executable instructions 1408. The executable instructions 1408 represent the executable instructions of the software architecture 1402, including implementation of the methods, modules, and so forth discussed above. The hardware layer 1404 also includes memory or storage modules 1410, which also have the executable instructions 1408. The hardware layer 1404 may also comprise other hardware 1412, which represents any other hardware of the hardware layer 1404, such as the other hardware illustrated as part of the machine 1400.

In the example architecture of FIG. 14, the software architecture 1402 may be conceptualized as a stack of layers, where each layer provides particular functionality. For example, the software architecture 1402 may include layers such as an operating system 1414, libraries 1416, frameworks/middleware 1418, applications 1420, and a presentation layer 1444. Operationally, the applications 1420 or other components within the layers may invoke API calls 1424 through the software stack and receive a response, returned values, and so forth (illustrated as messages 1426) in response to the API calls 1424. The layers illustrated are representative in nature, and not all software architectures have all layers. For example, some mobile or special purpose operating systems may not provide a frameworks/middleware 1418 layer, while others may provide such a layer. Other software architectures may include additional or different layers.

The operating system 1414 may manage hardware resources and provide common services. The operating system 1414 may include, for example, a kernel 1428, services 1430, and drivers 1432. The kernel 1428 may act as an abstraction layer between the hardware and the other software layers. For example, the kernel 1428 may be responsible for memory management, processor management (e.g., scheduling), component management, networking, security settings, and so on. The services 1430 may provide other common services for the other software layers. The drivers 1432 may be responsible for controlling or interfacing with the underlying hardware. For instance, the drivers 1432 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1416 may provide a common infrastructure that may be utilized by the applications 1420 and/or other components and/or layers. The libraries 1416 typically provide functionality that allows other software modules to perform tasks in an easier fashion than by interfacing directly with the underlying operating system 1414 functionality (e.g., kernel 1428, services 1430, or drivers 1432). The libraries 1416 may include system libraries 1434 (e.g., C standard library) that may provide functions such as memory allocation functions, string manipulation functions, mathematic functions, and the like. In addition, the libraries 1416 may include API libraries 1436 such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1416 may also include a wide variety of other libraries 1438 to provide many other APIs to the applications 1420 and other software components/modules.

The frameworks 1418 (also sometimes referred to as middleware) may provide a higher-level common infrastructure that may be utilized by the applications 1420 or other software components/modules. For example, the frameworks 1418 may provide various graphic user interface (GUI) functions, high-level resource management, high-level location services, and so forth. The frameworks 1418 may provide a broad spectrum of other APIs that may be utilized by the applications 1420 and/or other software components/modules, some of which may be specific to a particular operating system or platform.

The applications 1420 include built-in applications 1440 and/or third-party applications 1442. Examples of representative built-in applications 1440 may include, but are not limited to, a home application, a contacts application, a browser application, a book reader application, a location application, a media application, a messaging application, or a game application.

The third-party applications 1442 may include any of the built-in applications 1440, as well as a broad assortment of other applications. In a specific example, the third-party applications 1442 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party applications 1442 may invoke the API calls 1424 provided by the mobile operating system such as the operating system 1414 to facilitate functionality described herein.

The applications 1420 may utilize built-in operating system functions (e.g., kernel 1428, services 1430, or drivers 1432), libraries (e.g., system libraries 1434, APIs 1436, and other libraries 1438), or frameworks/middleware 1418 to create user interfaces to interact with users of the system. Alternatively, or additionally, in some systems, interactions with a user may occur through a presentation layer, such as the presentation layer 1444. In these systems, the application/module "logic" can be separated from the aspects of the application/module that interact with the user.

Some software architectures utilize virtual machines. In the example of FIG. 14, this is illustrated by a virtual machine 1448. A virtual machine creates a software environment where applications/modules can execute as if they were executing on a hardware machine e.g., the machine 1500 of FIG. 15, for example). A virtual machine 1448 is hosted by a host operating system (e.g., operating system 1414) and typically, although not always, has a virtual machine monitor 1446, which manages the operation of the virtual machine 1448 as well as the interface with the host operating system (e.g., operating system 1414). A software architecture executes within the virtual machine 1448, such as an operating system 1450, libraries 1452, frameworks/middleware 1454, applications 1456, or a presentation layer 1458. These layers of software architecture executing within the virtual machine 1448 can be the same as corresponding layers previously described or may be different.

Figure 15:
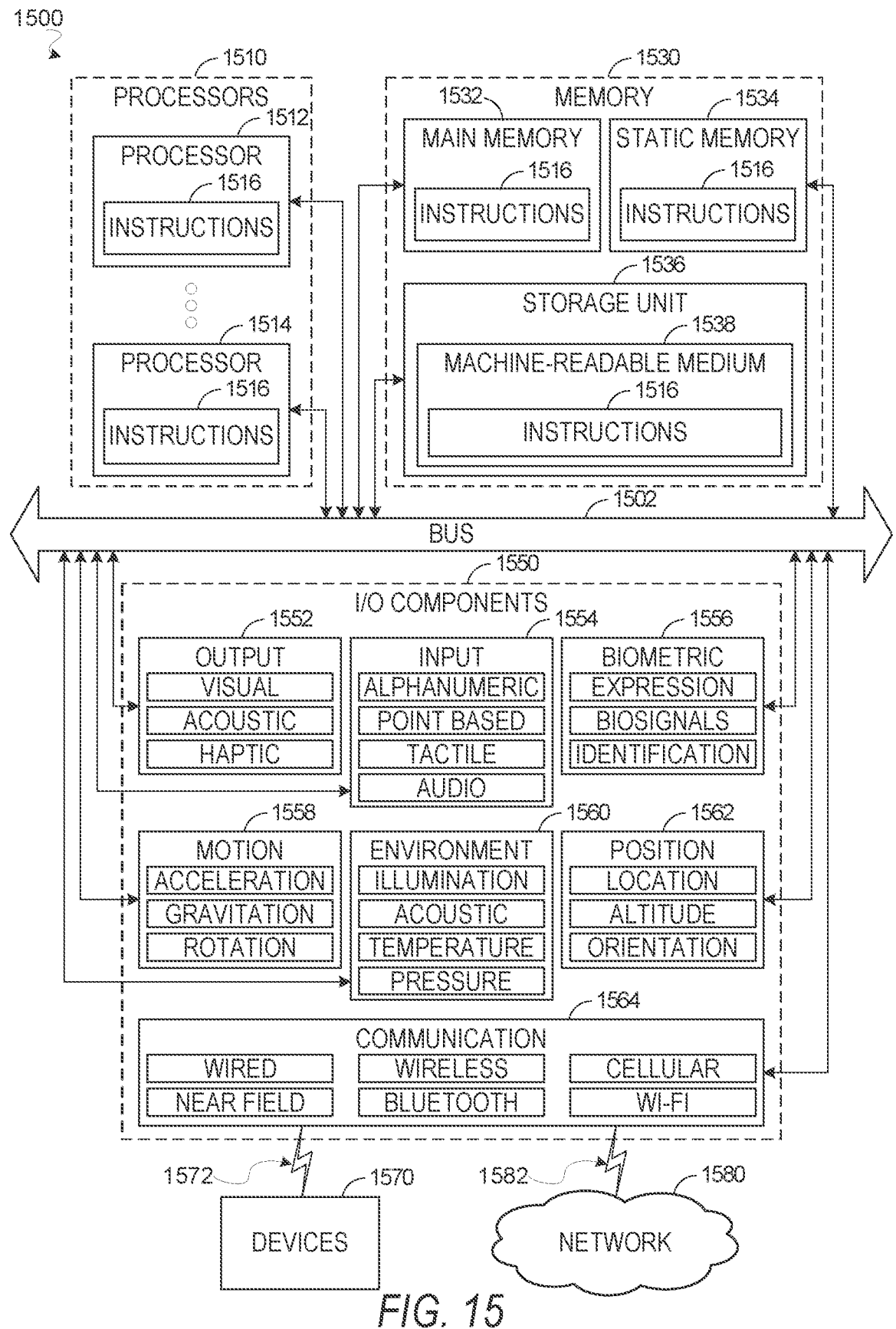
FIG. 15 is a block diagram illustrating components of a machine, according to some example embodiments, able to read instructions from a machine-readable medium (e.g., a machine-readable storage medium) and perform any one or more of the methodologies discussed herein.

FIG. 15 illustrates a diagrammatic representation of a machine 1500 in the form of a computer system within which a set of instructions may be executed for causing the machine to perform any one or more of the methodologies discussed herein, according to an example embodiment. Specifically, FIG. 15 shows a diagrammatic representation of the machine 1500 in the example form of a computer system, within which instructions 1516 (e.g., software, a program, an application, an applet, an app, or other executable code) for causing the machine 1500 to perform any one or more of the methodologies discussed herein may be executed. For example the instructions 1516 may cause the machine 1500 to execute the methods discussed above. Additionally, or alternatively, the instructions 1516 may implement the methods discussed above. The instructions 1516 transform the general, non-programmed machine 1500 into a particular machine 1500 programmed to carry out the described and illustrated functions in the manner described. In alternative embodiments, the machine 1500 operates as a standalone device or may be coupled (e.g., networked) to other machines. In a networked deployment, the machine 1500 may operate in the capacity of a server machine or a client machine in a server-client network environment, or as a peer machine in a peer-to-peer (or distributed) network environment. The machine 1500 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1516, sequentially or otherwise, that specify actions to be taken by the machine 1500. Further, while only a single machine 1500 is illustrated, the term "machine" shall also be taken to include a collection of machines 1500 that individually or jointly execute the instructions 1516 to perform any one or more of the methodologies discussed herein.

The machine 1500 may include processors 1510, memory 1530, and I/O components 1550, which may be configured to communicate with each other such as via a bus 1502. In an example embodiment, the processors 1510 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1512 and a processor 1514 that may execute the instructions 1516. The term "processor" is intended to include multi-core processors that may comprise two or more independent processors (sometimes referred to as "cores") that may execute instructions contemporaneously. Although FIG. 15 shows multiple processors 1510, the machine 1500 may include a single processor with a single core, a single processor with multiple cores (e.g., a multi-core processor), multiple processors with a single core, multiple processors with multiples cores, or any combination thereof.

The memory 1530 may include a main memory 1532, a static memory 1534, and a storage unit 1536, both accessible to the processors 1510 such as via the bus 1502. The main memory 1530, the static memory 1534, and storage unit 1536 store the instructions 1516 embodying any one or more of the methodologies or functions described herein. The instructions 1516 may also reside, completely or partially, within the main memory 1532, within the static memory 1534, within the storage unit 1536, within at least one of the processors 1510 (e.g., within the processor's cache memory), or any suitable combination thereof, during execution thereof by the machine 1500.

The I/O components 1550 may include a wide variety of components to receive input, provide output, produce output, transmit information, exchange information, capture measurements, and so on. The specific I/O components 1550 that are included in a particular machine will depend on the type of machine. For example, portable machines such as mobile phones will likely include a touch input device or other such input mechanisms, while a headless server machine will likely not include such a touch input device. It will be appreciated that the I/O components 1550 may include many other components that are not shown in FIG. 15. The I/O components 1550 are grouped according to functionality merely for simplifying the following discussion and the grouping is in no way limiting. In various example embodiments, the I/O components 1550 may include output components 1552 and input components 1554. The output components 1552 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1554 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1550 may include biometric components 1556, motion components 1558, environmental components 1560, or position components 1562, among a wide array of other components. For example, the biometric components 1556 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1558 may include acceleration sensor components (e.g., accelerometer), gravitation sensor components, rotation sensor components (e.g., gyroscope), and so forth. The environmental components 1560 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1562 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1550 may include communication components 1564 operable to couple the machine 1500 to a network 1580 or devices 1570 via a coupling 1582 and a coupling 1572, respectively. For example, the communication components 1564 may include a network interface component or another suitable device to interface with the network 1580. In further examples, the communication components 1564 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1570 may be another machine or any of a wide variety of peripheral devices (e.g., a peripheral device coupled via a USB).

Moreover, the communication components 1564 may detect identifiers or include components operable to detect identifiers. For example, the communication components 1564 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1564, such as location via Internet Protocol (IP) geolocation, location via Wi-Fi® signal triangulation, location via detecting an NFC beacon signal that may indicate a particular location, and so forth.

Executable Instructions and Machine Storage Medium

The various memories (i.e., 1530, 1532, 1534, and/or memory of the processor(s) 1510) and/or storage unit 1536 may store one or more sets of instructions and data structures (e.g., software) embodying or utilized by any one or more of the methodologies or functions described herein. These instructions (e.g., the instructions 1516), when executed by processor(s) 1510, cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 1580 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1580 or a portion of the network 1580 may include a wireless or cellular network, and the coupling 1582 may be a Code Division Multiple Access (CDMA) connection, a Global System for Mobile communications (GSM) connection, or another type of cellular or wireless coupling. In this example, the coupling 1582 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1516 may be transmitted or received over the network 1580 using a transmission medium via a network interface device (e.g., a network interface component included in the communication components 1564) and utilizing any one of a number of well-known transfer protocols (e.g., hypertext transfer protocol (HTTP)). Similarly, the instructions 1516 may be transmitted or received using a transmission medium via the coupling 1572 (e.g., a peer-to-peer coupling) to the devices 1570. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1516 for execution by the machine 1500, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

Glossary

"CARRIER SIGNAL" in this context refers to any intangible medium that is capable of storing, encoding, or carrying instructions 1516 for execution by the machine 1500, and includes digital or analog communications signals or other intangible media to facilitate communication of such instructions 1516. Instructions 1516 may be transmitted or received over the network 1580 using a transmission medium via a network interface device and using any one of a number of well-known transfer protocols.

"CLIENT DEVICE" in this context refers to any machine 1500 that interfaces to a communications network 1580 to obtain resources from one or more server systems or other client devices 102. A client device 102 may be, but is not limited to, a mobile phone, desktop computer, laptop, PDA, smartphone, tablet, ultrabook, netbook, multi-processor system, microprocessor-based or programmable consumer electronics system, game console, set-top box, or any other communication device that a user may use to access a network 1580.

"COMMUNICATIONS NETWORK" in this context refers to one or more portions of a network 1580 that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network 1580 may include a wireless or cellular network and the coupling may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"EMPHEMERAL MESSAGE" in this context refers to a message 400 that is accessible for a time-limited duration. An ephemeral message 502 may be a text, an image, a video, and the like. The access time for the ephemeral message 502 may be set by the message sender. Alternatively, the access time may be a default setting or a setting specified by the recipient. Regardless of the setting technique, the message 400 is transitory.

"MACHINE-READABLE MEDIUM" in this context refers to a component, a device, or other tangible media able to store instructions 1516 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EPROM)), and/or any suitable combination thereof. The term "machine-readable medium" should be taken to include a single medium or multiple media (e.g., a centralized or distributed database, or associated caches and servers) able to store instructions 1516. The term "machine-readable medium" shall also be taken to include any medium, or combination of multiple media, that is capable of storing instructions 1516 (e.g., code) for execution by a machine 1500, such that the instructions 1516, when executed by one or more processors 1510 of the machine 1500, cause the machine 1500 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, a physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor 1512 or a group of processors 1510) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine 1500) uniquely tailored to perform the configured functions and are no longer general-purpose processors 1510. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering embodiments in which hardware components are temporarily configured (e.g., programmed), each of the hardware components need not be configured or instantiated at any one instance in time. For example, where a hardware component comprises a general-purpose processor 1512 configured by software to become a special-purpose processor, the general-purpose processor 1512 may be configured as respectively different special-purpose processors (e.g., comprising different hardware components) at different times. Software accordingly configures a particular processor 1512 or processors 1510, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between or among such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors 1510 that are temporarily configured (e.g., by software) or permanently configured to perform the relevant operations. Whether temporarily or permanently configured, such processors 1510 may constitute processor-implemented components that operate to perform one or more operations or functions described herein. As used herein, "processor-implemented component" refers to a hardware component implemented using one or more processors 1510. Similarly, the methods described herein may be at least partially processor-implemented, with a particular processor 1512 or processors 1510 being an example of hardware. For example, at least some of the operations of a method may be performed by one or more processors 1510 or processor-implemented components. Moreover, the one or more processors 1510 may also operate to support performance of the relevant operations in a "cloud computing" environment or as a "software as a service" (SaaS). For example, at least some of the operations may be performed by a group of computers (as examples of machines 1500 including processors 1510), with these operations being accessible via a network 1580 (e.g., the Internet) and via one or more appropriate interfaces (e.g., an API). The performance of certain of the operations may be distributed among the processors 1510, not only residing within a single machine 1500, but deployed across a number of machines 1500. In some example embodiments, the processors 1510 or processor-implemented components may be located in a single geographic location (e.g., within a home environment, an office environment, or a server farm). In other example embodiments, the processors 1510 or processor-implemented components may be distributed across a number of geographic locations.

"PROCESSOR" in this context refers to any circuit or virtual circuit (a physical circuit emulated by logic executing on an actual processor 1512) that manipulates data values according to control signals (e.g., "commands," "op codes," "machine code," etc.) and which produces corresponding output signals that are applied to operate a machine 1500. A processor may, for example, be a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), or any combination thereof. A processor 1510 may further be a multi-core processor 1510 having two or more independent processors 1512, 1514 (sometimes referred to as "cores") that may execute instructions 1516 contemporaneously.

"TIMESTAMP" in this context refers to a sequence of characters or encoded information identifying when a certain event occurred, for example giving date and time of day, sometimes accurate to a small fraction of a compact.

What is claimed is:

1. A system comprising:
   one or more processors of a machine; and
   one or more memories storing instructions that, when executed by the one or more processors, cause the machine to perform operations comprising:
   identifying an object in an image;
   selecting a neural network trained to apply an effect to images that comprise the object; and
   generating a result image by using the neural network to apply the effect to the image, wherein the neural network is trained on input data and output data generated by a teacher generative neural network, and wherein the neural network is trained based on default losses for the effect and an additional loss specific to the object.

2. The system of claim 1, wherein the neural network is a first neural network, and wherein identifying the object in the image further comprises:
   identifying, using a plurality of second neural networks, the object in the image, wherein each of the plurality of second neural networks is trained to recognize one object of a plurality of objects.

3. The system of claim 1, wherein the selecting the neural network further comprises:
   selecting the neural network from a plurality of neural networks, wherein each of the plurality of neural networks is trained to apply the effect to images comprising a corresponding object of a plurality of objects.

4. The system of claim 1, wherein the selecting the neural network further comprises:
   selecting the neural network from a plurality of neural networks, wherein each of the plurality of neural networks is trained to apply a corresponding effect of a plurality of effects for images comprising the object.

5. The system of claim 1, wherein the neural network is one of a plurality of neural networks, and wherein one of the plurality of neural networks is trained to apply the effect for each object of a plurality of objects, the plurality of objects comprising the object.

6. The system of claim 5, wherein the operations further comprise:
   training the plurality of neural networks on input data and output data generated by a teacher generative neural network using adversarial loss, wherein a neural network is trained for each object of the plurality of objects.

7. The system of claim 6, wherein the plurality of neural networks are trained using a discriminative neural network that evaluates data output by the plurality of neural networks compared with target data.

8. The system of claim 5 wherein the system is a mobile device, and wherein the plurality of neural networks are stored on the mobile device.

9. The system of claim 1, wherein the system is a mobile device, and wherein the operations further comprise:
   accessing input from a user of the mobile device to apply the effect to the image.

10. The system of claim 9, wherein the operations further comprise:

identifying the input data and the output data of a teacher generative neural network, the output data generated by modifying the input data using the teacher generative neural network.

11. The system of claim 1, wherein the operations further comprise:
training the neural network on input data and output data generated by a teacher generative neural network using adversarial loss, wherein the neural network is trained for the object.

12. The system of claim 1, wherein the effect is at least one of a painting style transfer, an aging style transfer, a wrinkle remover, a youth style transfer, or an aging style transfer.

13. The system of claim 1, wherein the object is at least one of teeth, a car, or an apple.

14. The system of claim 1, wherein the default losses comprise: a perception loss, an adversarial loss, and a high-frequency loss.

15. A method comprising:
identifying, by one or more processors, an object in an image;
selecting a neural network trained to apply an effect to images that comprise the object; and
generating a result image by using the neural network to apply the effect to the image, wherein the neural network is trained on input data and output data generated by a teacher generative neural network, and wherein the neural network is trained based on default losses for the effect and an additional loss specific to the object.

16. The method of claim 15, wherein the neural network is a first neural network, and wherein identifying the object in the image further comprises:
identifying, using a plurality of second neural networks, the object in the image, wherein each of the plurality of second neural networks is trained to recognize one object of a plurality of objects.

17. The method of claim 15, wherein the selecting the neural network further comprises:
selecting the neural network from a plurality of neural networks, wherein each of the plurality of neural networks is trained to apply the effect to images comprising a corresponding object of a plurality of objects.

18. A non-transitory machine-readable storage medium embodying instructions that, when executed by one or more processors, cause the one or more processors to perform operations comprising:
identifying, by one or more processors, an object in an image;
selecting a neural network trained to apply an effect to images that comprise the object; and
generating a result image by using the neural network to apply the effect to the image, wherein the neural network is trained on input data and output data generated by a teacher generative neural network, and wherein the neural network is trained based on default losses for the effect and an additional loss specific to the object.

19. The non-transitory machine-readable storage medium of claim 18, wherein the neural network is a first neural network, and wherein identifying the object in the image further comprises:
identifying, using a plurality of second neural networks, the object in the image, wherein each of the plurality of second neural networks is trained to recognize one object of a plurality of objects.

* * * * *